(12) United States Patent
Stahl et al.

(10) Patent No.: US 10,982,987 B2
(45) Date of Patent: Apr. 20, 2021

(54) DEVICE FOR POWDER METERING FOR CHEMICAL PRODUCTION PROCESSES UNDER CLEAN-ROOM CONDITIONS, USE THEREOF AND METERED ADDITION METHOD

(71) Applicant: ANCOSYS GMBH, Pliezhausen (DE)

(72) Inventors: Juerg Stahl, Winterthur (CH); Irene Popova, Beacon, NY (US); Christian Rueckl, Pliezhausen (DE)

(73) Assignee: ANCOSYS GMBH, Pliezhausen (DE)

( * ) Notice: Subject to any disclaimer, the term of this patent is extended or adjusted under 35 U.S.C. 154(b) by 0 days.

(21) Appl. No.: 16/812,020

(22) Filed: Mar. 6, 2020

(65) Prior Publication Data
US 2020/0348161 A1    Nov. 5, 2020

Related U.S. Application Data

(62) Division of application No. 16/078,998, filed as application No. PCT/EP2017/055944 on Mar. 14, 2017.

(30) Foreign Application Priority Data

Jun. 20, 2016  (DE) .......................... 102016111214.3

(51) Int. Cl.
*G01F 11/28* (2006.01)
*B01J 8/00* (2006.01)
(Continued)

(52) U.S. Cl.
CPC ............. *G01F 11/282* (2013.01); *B01J 8/003* (2013.01); *B01J 8/0025* (2013.01); *B01J 8/0035* (2013.01);
(Continued)

(58) Field of Classification Search
CPC .... G01F 11/282; G01F 11/003; G01F 11/284; G01F 15/12; B01J 8/0025; B01J 8/003;
(Continued)

(56) References Cited

U.S. PATENT DOCUMENTS

| | | | |
|---|---|---|---|
| 4,850,978 A | 7/1989 | Dudar et al. | |
| 5,147,551 A * | 9/1992 | Averette ............. | G01N 35/1079 210/640 |

(Continued)

FOREIGN PATENT DOCUMENTS

| | | |
|---|---|---|
| DE | 3026816 A1 | 2/1982 |
| DE | 102005005359 A1 | 8/2006 |

(Continued)

OTHER PUBLICATIONS

Notification of Transmittal of English translation of the International Preliminary Report on Patentability dated Jan. 3, 2019, in PCT Application No. PCT/EP2017/055944.

*Primary Examiner* — Nicolas A Arnett
(74) *Attorney, Agent, or Firm* — Kriegsman & Kriegsman

(57) ABSTRACT

Device for metering powder, in particular in clean-rooms, which includes a vessel containing powder and a sealing head with a septum for the vessel, wherein the sealing head is connectable powder-tight with the vessel and the septum powder-tight with the sealing head and the device further includes a vessel holder, which serves to hold the sealing head of the vessel, and the vessel with its opening points downwards, so that the powder can flow out of the vessel, wherein a gap is provided between the sealing head and a holding bowl of the vessel holder, in which a gas flow between the holding bowl and the sealing head can be created. The invention also relates to a use of the device and a metered addition method.

20 Claims, 16 Drawing Sheets

(51) Int. Cl.
    *G01F 11/00*   (2006.01)
    *G01F 15/12*   (2006.01)
(52) U.S. Cl.
    CPC ............ *G01F 11/003* (2013.01); *G01F 15/12*
        (2013.01); *B01J 2204/005* (2013.01); *B01J*
        *2208/00212* (2013.01); *B01J 2208/00752*
        (2013.01); *B01J 2208/00867* (2013.01); *B01J*
        *2208/00893* (2013.01); *B01J 2219/00335*
        (2013.01); *B01J 2219/00414* (2013.01); *G01F*
        *11/284* (2013.01)
(58) Field of Classification Search
    CPC ............... B01J 8/0035; B01J 2204/005; B01J
        2208/00867; B01J 2208/00752; B01J
        2208/00893; B01J 2208/00212; B01J
        2219/00414; B01J 2219/00335
    See application file for complete search history.

(56) References Cited

U.S. PATENT DOCUMENTS

| | | | | |
|---|---|---|---|---|
| 5,432,098 | A | 7/1995 | Wilks | |
| 5,777,245 | A * | 7/1998 | Chandrachood | G01N 15/02 73/37 |
| 5,826,633 | A * | 10/1998 | Parks | B65B 9/042 141/18 |
| 6,250,513 | B1 * | 6/2001 | Haas | B41F 23/06 222/414 |
| 7,082,848 | B2 * | 8/2006 | Fjerdingstad | G01N 1/14 73/863.41 |
| 7,993,459 | B2 * | 8/2011 | Long | C23C 14/246 118/726 |
| 8,076,224 | B2 * | 12/2011 | Kormanyos | H01L 31/1872 438/503 |
| 8,438,988 | B2 * | 5/2013 | Sugimoto | G01F 11/46 118/126 |
| 8,763,653 | B2 * | 7/2014 | Weigel | B65B 1/36 141/81 |
| 10,214,811 | B2 * | 2/2019 | King | C04B 41/5041 |
| 10,717,096 | B2 * | 7/2020 | Lutz | B05B 7/1459 |
| 2009/0078194 | A1 | 3/2009 | Sugimoto | |
| 2015/0298873 | A1 | 10/2015 | Nielsen | |
| 2017/0202743 | A1 * | 7/2017 | Wu | A61J 1/2003 |
| 2019/0025107 | A1 | 1/2019 | Stahl et al. | |

FOREIGN PATENT DOCUMENTS

| | | |
|---|---|---|
| EP | 2311513 A1 | 4/2011 |
| FR | 2219894 A1 | 9/1974 |

* cited by examiner

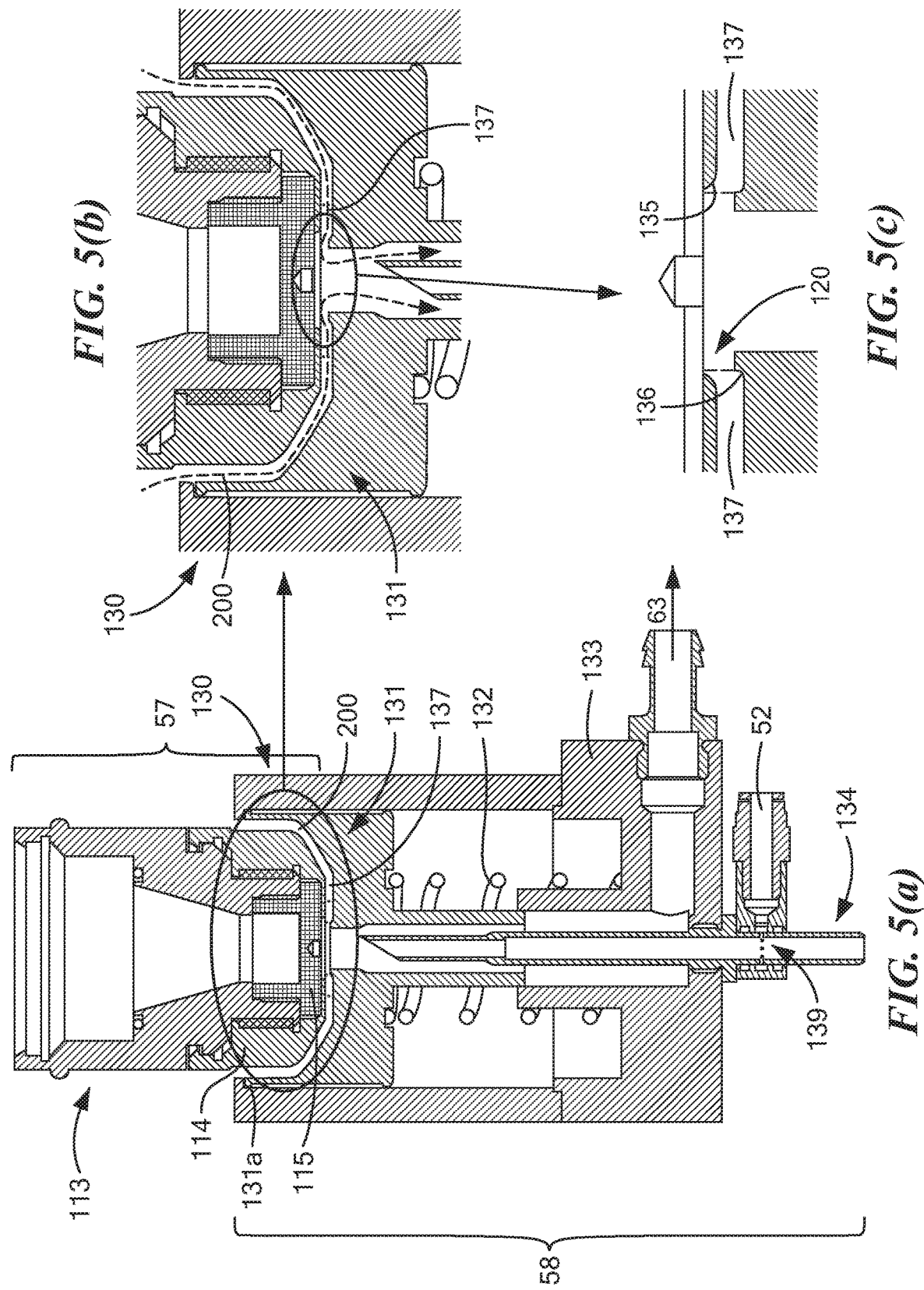

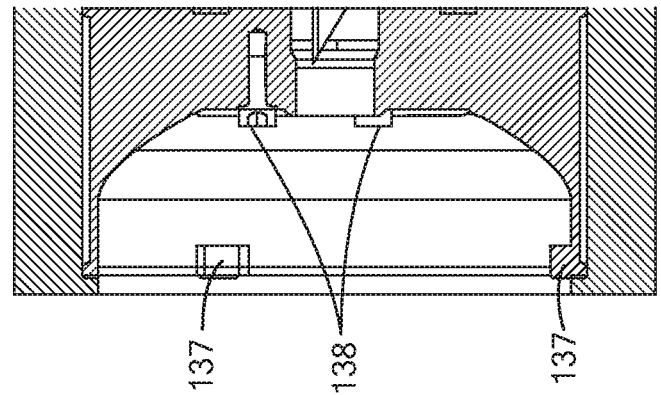
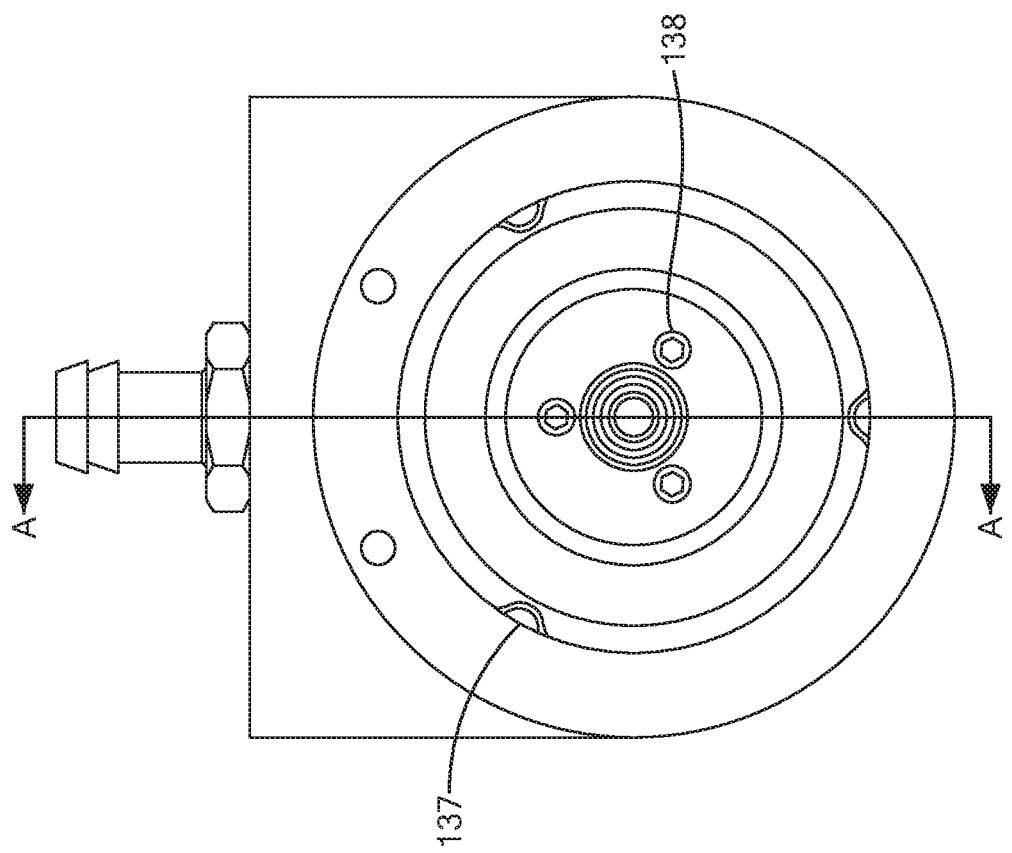

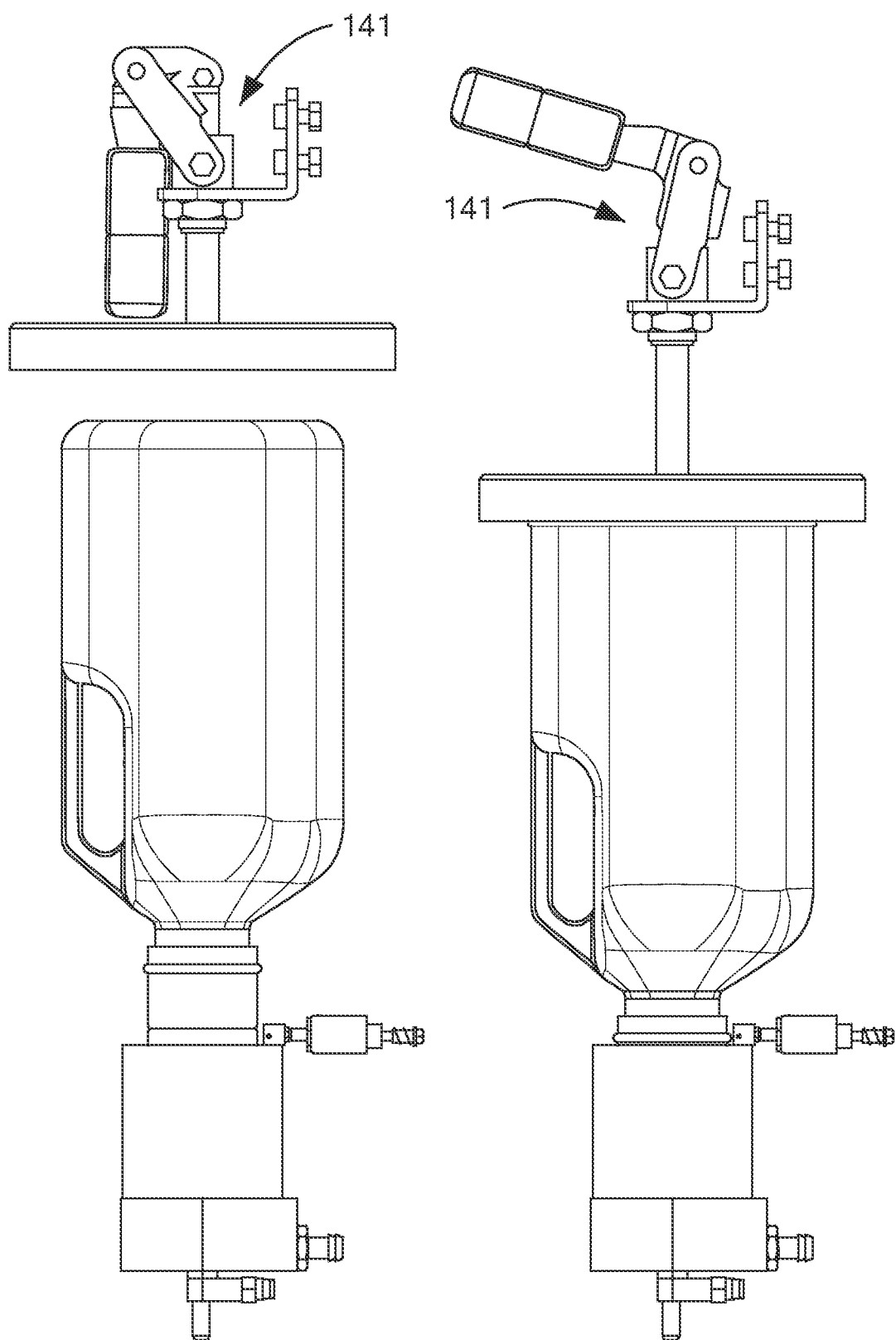
*FIG. 7(a)*          *FIG. 7(b)*

DEVICE FOR POWDER METERING FOR CHEMICAL PRODUCTION PROCESSES UNDER CLEAN-ROOM CONDITIONS, USE THEREOF AND METERED ADDITION METHOD

CROSS-REFERENCE TO RELATED APPLICATIONS

The present application is a divisional of U.S. patent application Ser. No. 16/078,998, inventors Juerg Stahl et al., filed Aug. 22, 2018, which, in turn, is a 371 of International Application No. PCT/EP2017/055944, filed Mar. 14, 2017, the disclosures of which are incorporated herein by reference.

BACKGROUND OF THE INVENTION

The present invention relates to a device for powder metering for chemical production processes under clean-room conditions, the use of the device for powder metering and methods for the production of chemical products using this device.

In chemical production processes such as for example coating or electroplating, pickling, degreasing, etching, in precipitations, etc., mixtures of a great variety of substances are used. The concentrations of the substances concerned must be maintained in a narrow production window in order to ensure always the same production quality. Since not all substances are consumed equally, the concentration of the individual substances must be determined and each replenished after deviation from the required value. In very many processes, the later metering is performed in liquid form.

The advantage of liquids is the ease of metering by means of pumps. These are very easy to control and, depending on the volume which is needed per unit time, easy to scale. Since the substances to be metered in must be present in dissolved, liquid form, either water or another solvent is added to the process as a main constituent. Over a prolonged period, this can lead to non-optimal behaviour of the process. Also, the transport weight of the solution is many times higher than that of the pure dissolved substance which is needed. This leads to increased costs and greater environmental pollution.

In many cases, therefore, solids such as powders or granules are used to replenish the process. In this way, unnecessary loading of the process with other substances (water, solvents) and the transport weight can be markedly reduced. Also, the storage life of a powder is as a rule considerably longer than that of a liquid concentrate. The aforesaid disadvantages of metering in liquid form can justify the higher technical effort of using powder in a method. However, in the later metering of powder, dust evolution, the danger of contaminating the environment during the transfer of the powder from a container into the process and also endangerment of the health of persons can arise.

Usually the metering of powders is effected with screw conveyors and conveyor belts of any size. A disadvantage with these transport devices is that these have a large number of moving parts, which leads to material wear of the transport device. There is also the danger of this wear and the lubricants used contaminating the powder to be introduced. For many applications, the impurities are so slight that this is relevant neither for the production process nor for the environment.

On the other hand, in applications such as the pharmaceutical or semiconductor industry, in which impurities in the smallest quantities must be avoided, this is nonetheless a method uncertainty not to be ignored.

A device for the metering of powder with a container with a sealing head and a vessel holder is known from US 2009/0078194 A1.

In the pharmaceutical industry as in the semiconductor industry, production is under clean-room conditions, and dust evolution of any kind under clean-room conditions is a major problem. In clean-rooms according to ISO1 to ISO4 (according to ISO 14644-1) no particles ≥5 μm may be generated or present.

Also, ever more substances are being identified as harmful to health and classified accordingly. Unfortunately, there is not a harmless replacement substance for all these substances. Thus it is very important to protect the staff from health hazards. If substances of concern are used in powder form in a production process, the emergence of powder must be avoided in every case, as can be seen from the following example of the metering of crystalline boric acid into nickel plating electrolytes:

An essential component of the nickel baths is boric acid in concentrations of up to 45 g/l. In June 2010, boric acid was included by the ECHA on the candidate list for SVHC (substances of very high concern). After the GHS order 1272/2008/EG and the REACH modification VO 790/2009/EG came into force, boric acid was designated as reprotoxic. According to the GHS order, mixtures which contain boric acid in a concentration of >5.5% are also to be designated as reprotoxic. Unfortunately, no replacement substances for these applications have yet been found. Nickel plating is a widespread surface finishing process and is used in many different industries, such as the automobile and circuit board industries. Since the solubility of boric acid in water at 20° C. of 47 g/l is very close to the specified concentration of the process, boric acid cannot be replenished as a solution—at least not if the specified concentration is greater than 25 g/l. For processes with a high boric acid concentration, the state of the art is that the addition takes place manually with crystalline boric acid. The personnel is thereby exposed to a constant hazard. Here a solids metering process would be the means of choice in order to protect the personnel against the hazards.

The same nickel electrolytes are also used in the semiconductor industry, where the protection both of the personnel and of the clean-rooms is imperative.

A further example of the advantages of powder metering relates to wafer coating with tin or a tin alloy in the semiconductor industry:

Tin and tin alloy plating on wafers has grown greatly in the last ten years. Essentially, two tin processes are used on a large scale: the plating of pure tin and of tin alloys. Among the tin alloys, the alloy SnAg (tin and silver) is most commonly used, where other alloy components such as for example bismuth or copper can also be added to the tin. In all applications, both with pure tin and also with tin alloys, 1 g to 6 g of tin is typically deposited per wafer. It is not possible to operate the SnAg process with soluble tin anodes, because of the uncontrolled/uncontrollable plating of silver (immersion because of the different electrochemical properties of the two metals), consequently inert anodes are as a rule used. A typical production plant (plater) has a throughput of 150 to 400 wafers per day, depending on the number of plating chambers available and the plating times. This means that per day and plater between 450 g and 2400 g of tin are plated. Replenishing solutions with a concentration of 200 g/l to 400 g/l of $Sn^{2+}$ dissolved in MSA (methanesulphonic acid) are available commercially. Thus, per day and tank, 2 to 12 l of metal concentrates must be added. As a result, after a certain time the tank would overflow. In order to avoid this, a volume of electrolyte corresponding to the volume to be added is aspirated from the tank and as a rule sent to waste. In the best case, this "waste electrolyte" is processed. For logistical reasons or as a result of a lack of infrastructure, recycling of tin is mostly costly and thus not economical.

For most applications in wafer coating, so-called low α tin is exclusively used. The emission rate of α particles is typically less than 0.001 cph/cm². Since low α tin in the production process is very expensive and the production of the liquid concentrates drives the price still higher, it is desirable for cost reasons to avoid waste. This would also be desirable from the environmental viewpoint.

The reaction equations (neglecting the alloying metal) are as follows:

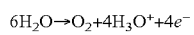  Anode:

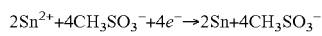  Cathode:

At the inert anode, water is cleaved (electrolyzed) and in the process free acid ($H_3O^+$) is formed. As a result, the free acid content continually increases. At the cathode, the tin ions are reduced to elemental Sn. The state of the art is metered addition of the reduced tin as $Sn^{2+}$ methanesulphonate in MSA methanesulphonic acid.

The following disadvantageous effects thereby result:

The tank volume increasing owing to the metered addition must be kept in balance by the discharge of tin bath liquid (volume to be discharged=volume to be added).

The MSA content (free acid) increases continually, as a result of which the operating point of the electrolyte shifts continually. The behaviour of the organic bath additives is influenced by the changing acid content. This has the effect that the plating properties of the process continually change. Depending on the process and the structures to be plated, the lifetime of the electrolyte is limited. Typically this limit lies at an MSA concentration of ca. 250 g/l. Depending on throughput, this occurs after a few weeks and the whole tank of ca. 150 l must be discharged and discarded.

Both of these disadvantageous effects could be avoided if tin monoxide SnO powder could be used for metering the reduced tin according to the following reaction equation:

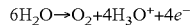  Anode:

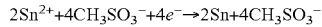  Cathode:

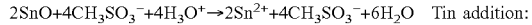  Tin addition:

The same also applies for the addition of copper(II) oxide CuO.

With this method, both the rise in the free acid and also the increase in the tank volume would be prevented, whereby two positive effects arise: no electrolyte would have to be discharged in order to avoid an overflow of the tank, and the content of free acid would remain constant, as a result of which the lifetime of the electrolyte would be significantly prolonged.

However, for such a method it would also be necessary to be able to add further tin oxide powder or copper(II) oxide powder under clean-room conditions.

SUMMARY OF THE INVENTION

The present invention is thus based on the problem of providing a device which makes it possible to meter powder in clean-rooms into liquid production processes without even the smallest quantities emerging into the production rooms or personnel being able to come into contact with it.

This problem is solved by the features of Claims 1 and 12.

The device according to the invention for metering powder, in particular into clean-rooms, comprises a vessel containing powder and a sealing head with a septum for the vessel, wherein the sealing head is connectable powder-tight with the vessel and the septum powder-tight with the sealing head, and a vessel holder which serves to hold the sealing head of the vessel. The vessel points downwards with its opening, so that the powder can flow downwards from the vessel under the action of gravity and no additional mechanical means for transport such as screw conveyors or the like, which can result in wear, are necessary. According to the invention, a gap is provided between the sealing head and the holding bowl of the vessel holder, in which a gas flow between the holding bowl and the sealing head can be created.

Powder residues can be removed from the septum and sealing head by the gas flow.

It is essential that the discharge of the powder and the elimination of powder residues on the septum and on the sealing head take place exclusively on the basis of gravity and on the basis of gas flow, in particular air flows, and movable mechanical parts are thereby avoided.

In a preferred variant, it is provided that the cross-section of the gap between holding bowl and sealing head decreases in the direction of the septum, so that the flow rate increases in the direction of the septum and owing to the nozzle effect powder residues are at least almost quantitatively removed from the septum and the sealing head.

Preferably, the gap between holding bowl and sealing head is shaped such that the flow rate at the septum is maximal and/or the flow is directed against the septum, in order completely to remove powder particles from the septum and the sealing head. It is especially preferable that the flow rate at the septum is both maximal and is directed against the septum, i.e. that the angle between the flow rate and the surface of the septum is preferably between 0 and 45°.

In order to provide a powder-tight seal between the septum and the septum adapter, the sealing head has a septum adapter and a septum cap with an opening, wherein the septum cap serves to press the septum against the septum adapter. In the region of the opening of the septum cap, the septum is accessible and can then in this region be pierced by the cannula.

A further essential feature of the device according to the invention is that this is secured against unintended unscrewing of the powder vessel or unscrewing of the sealing head, for if the connections between the powder vessel and the sealing head or the connections within the sealing head were detachable, then powder would be able to penetrate outwards. In order to obtain connections which are non-detachable, or not unscrewable with normal forces, complementary locking or snap-on elements are formed on the sealing head and the vessel and/or complementary locking or snap-on elements are formed on the septum adapter and the septum cap, which after screwing or pushing of the sealing head onto the vessel or of the septum cap onto the septum adapter together enter into a connection no longer unscrewable with normal forces and thus not detachable.

The complete emptying of the powder from the powder vessel is preferably achieved through the vessel inside in the region down to the vessel thread and/or the septum adapter inside being shaped as a funnel and/or the device having at least one vibrator on the vessel and/or on the septum adapter.

In the context of the present invention, "powder" is understood to mean any flowable solid, irrespective of the particular particle diameter.

In the vessel holder, the cannula for piercing the septum is provided. In order to fluidize the powder and thus to prevent blockage of the cannula, a gas is fed into the cannula to fluidize the downward flowing powder, with the gas preferably being fed into the cannula via a side pipe and via openings in the cannula wall. Thereby a pressure equalization is simultaneously obtained. The side introduction of the gas is advantageous since the cross-section in the inside of the cannula is not diminished. Alternatively, the gas can also be introduced via an additional pipe in the inside of the cannula.

In general, the air flow is created by suction of the ambient air through a suction pipe, whereby the air is sucked in between the sealing head and holding bowl and is passed via a central hole in the holding bowl along the cannula to the connector of the suction pipe. It is also possible, but less preferable, to blow compressed air into the gap.

In a further preferred variant, the holding bowl of the vessel holder is pressed upwards against a stop on a guide pipe of the vessel holder by means of a spring element and the holding bowl is thus pressed against the sealing head, so that a defined, reproducible gap is provided for the air flow. For this, the holding bowl should also be designed such that the sealing head is introducible centred into the holding bowl. Notches and/or spacers should be provided on the vessel holder and/or the sealing head to form the gap.

Preferably, the device according to the invention is further equipped with a metering system which also dispenses with movable mechanical parts and is based only on the filling of a defined volume caused by gravity, in such a manner that a volume separable by valves is filled into a hose and can be emptied.

In order to avoid clumping of the powder, the sealing head connected to the metering system is preferably heatable.

In a further variant, the sealing head is connected to a mixing vessel which has an inlet channel whereby the process liquid is preferably passed tangentially into the inlet channel and the inlet channel preferably has an overflow weir in order to prevent powder deposits on the walls of the mixing vessel.

Also a subject of the present invention is a metering device which comprises a vessel containing powder and a sealing head with a septum for the vessel, wherein the vessel points downwards with its opening, so that the powder can flow out of the vessel, and the device further comprises a vessel holder which serves to hold the sealing head of the vessel, wherein the vessel holder has a cannula for piercing the septum and a gas for fluidizing the downward-flowing powder is fed into the cannula, and furthermore a metering system is provided, which is based on the filling of a separable volume into a connecting hose, with the bulk density of the powder in the connecting hose being essentially kept constant through a flow of the gas changing with time during the fluidization. Through the bulk density of the powder flowing into the metering system being kept essentially constant owing to the flow of the gas changing with time, it is quite possible to achieve the metering of the powder in clean-rooms via the volume and thus without movable parts, balances, etc.

In a preferred variant, the gas volume of the fluidization is between 0.3 and 3.0 times, preferably between 0.5 and 2.0 times the separable volume in the connecting hose. Also, for a constant bulk density it is advantageous if the flow of the gas is greatest at the end of the fluidization.

The invention also relates to a vessel containing powder, in particular boric acid, tin(II) oxide or copper(II) oxide, which container has a sealing head with a septum, with the sealing head being connected powder-tight to the vessel and the septum to the sealing head. Such a vessel serves for use for the metering of powder in the device described above.

The device according to the invention is particularly suitable for the metering of powders in clean-rooms or for the metering of powders harmful to health, in particular for the metering of boric acid, tin(II) oxide or Cu(II) oxide.

The present invention also relates to a method for the production of chemical products, in particular wafers or circuit boards, under clean-room conditions, in particular by coating, electroplating, pickling, degreasing etching, precipitations or chemical reactions, wherein the metered addition of the powders is effected with the device according to the invention.

BRIEF DESCRIPTION OF THE DRAWINGS

The invention and further advantageous embodiments and further developments thereof are described and explained in more detail on the basis of the examples shown in the drawings. The features to be learned from the description and the drawings can be used according to the invention individually per se or as several in any combination.

FIG. 5(c): an enlarged simplified view of the circled portion of FIG. 5(b) that shows the shape of the gap in the region of the septum, FIG. 6(a): a top view of the holding bowl of FIG. 5(a) that shows the notches and the spacers, FIG. 6(b): a section view of the holding bowl of FIG. 6(a) along line A-A;

FIG. 7(a): a side view of the vessel with the sealing head before actuation of the knee lever mechanism, FIG. 7(b): a side view of the vessel with the sealing head after actuation of the knee lever mechanism.

DETAILED DESCRIPTION OF THE INVENTION

Figure 1:
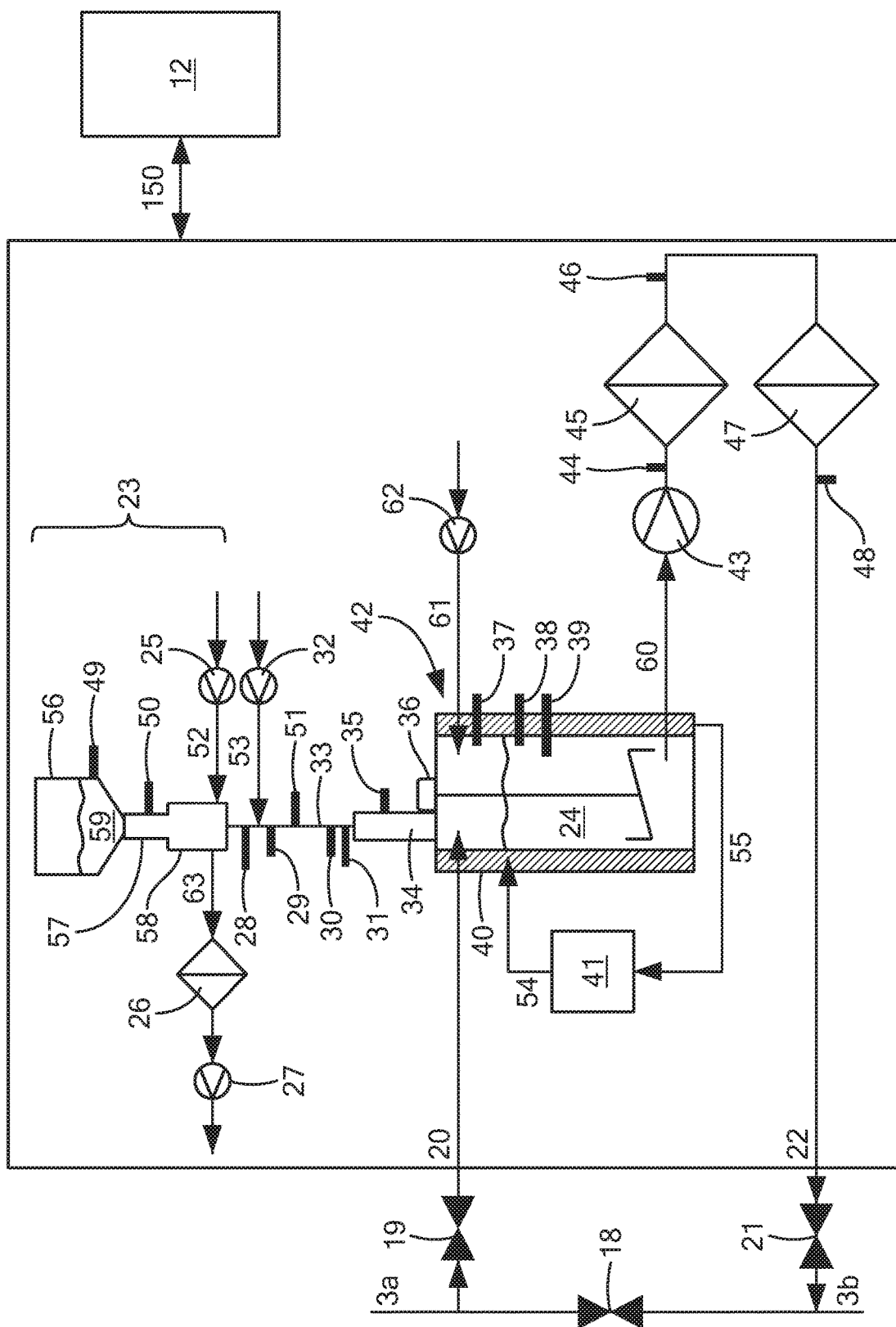
FIG. 1: a diagrammatic view of the powder metering device according to the invention, which is shown connected to a mixing vessel.

In FIG. 1, the design of the powder metering device 23 according to the invention, which is connected via a metering hose 33 to a mixing vessel 42 is shown diagrammatically. The powder 59 is located in a vessel 56, the opening 56a whereof is directed downwards. The vessel 56 has a special sealing head 57 and is fitted into the vessel holder 58, see also FIGS. 2, 3(a)-3(e), 4, and 5(a)-5(c). The vessel holder 58 enables the dust-free outflow of the powder 59 into the metering hose 33, from there into the connecting head 34 and from there into the mixing vessel 42, where the powder 59 dissolves in the process liquid.

The structure of the sealing head 57 is shown in FIGS. 2, 3(a)-3(e), and 4. As shown in FIG. 2 and FIGS. 3(a)-3(e), the sealing head 57 is screwed onto the vessel thread 111 of the vessel 56 instead of a normal twist closure. As a result, normal commercial vessels 56 can be used. As shown in the exploded drawing FIG. 4 the sealing head 57 consists, of the following parts: a sealing element 112, namely an O-ring, a septum adapter 113, a septum 115 and a septum cap 114.

The O-ring 112 seals between vessel thread 111 or the lower end of the vessel 56 and the septum adapter 113. As a result, the powder 59 is prevented from emerging at the connection site. The O-ring 112 is selected such that it effects a secure seal between the vessel thread 111 and the septum adapter 113 with all tolerances which arise from the individual parts in the screwed-together state.

It is important that the septum adapter 113 cannot separate unintentionally from the vessel thread 111, since otherwise powder 59 would emerge in an uncontrolled manner. In order to prevent this, locking or snap-on elements 116 are provided on the septum adapter 113, which on complete screwing on of the septum adapter 113 lock/snap into complementary locking or snap-on elements 117 provided on the vessel 56 above the vessel thread 111.

Above the vessel thread 111, the outer wall of the vessel 56 extends radially slanting slightly outwards and forms a sliding surface 117a, so that the septum adapter 113 can easily be screwed or pushed upwards along this slanting outer wall 117a of the vessel 56, whereby it is slightly pressed outwards on its upward-facing side. Above the slope 117a, the outer wall 117b of the vessel 56 extends radially inwards and forms a barrier surface 117b running perpendicular to the longitudinal axis of the vessel 56, behind which a holding space 117c is formed for the locking nose 116, also running radially inwards, on the septum adapter 113, which on pushing/screwing upwards locks into the holding space 117c. Through the locking nose 116 of the septum adapter 113 being in contact with the radially inward-facing surface 117b of the vessel, the septum adapter 113 can no longer be unscrewed or pushed downwards, so that the locking/snap-on connection 116 is not releasable by screwing, see FIGS. 3(b) and 3(c).

Through the design of the sliding surface 117a, it is possible with little force to screw the septum adapter 113 on, but almost impossible to remove this again after the locking hook 116 of the septum adapter 113 is snapped over complementary locking element 117b and c.

It must also be ensured that no powder 59 can emerge between septum adapter 113 and septum 115. When the septum cap 114 is screwed onto the septum adapter 113, the septum 115 is pushed through the septum cap 114 into the septum adapter 113 and prevents the emergence of powder 59.

Here also, it is necessary to prevent the septum cap 114 from being detachable unintentionally from the septum adapter 113. This is solved analogously to the previously described locking or snap-on connection 116, 117b and 117c, between the septum adapter 113 and the vessel 56, in such a manner that the septum adapter 113 also has a sliding surface 119a directed slightly outwards radially (see FIGS. 3(b) and 3(d)), so that the upper side of the septum cap 114 when screwed in and pushed upwards is pressed slightly outwards and then after travelling over the surface 119b running radially inwards at right angles to the longitudinal axis spring-locks with the locking hook 118 in the free space 119c. Since the barrier surface 119b runs at right angles to the longitudinal axis of the septum adapter 113, the locking connection can no longer be released by a screwing-on movement or by pulling downwards.

The vessel 56, the septum adapter 113 and the septum cap 114 can be made of various metals, coated metals, plastics or glass. It is not absolutely necessary that all parts be made of the same material. Preferably, chemically stable plastics are used. This ensures that even the smallest quantities of these plastics cannot adversely influence the process liquid.

As soon as the vessel 56 has been completely emptied of the powder 59, it can be removed from the vessel holder 58 together with the sealing head 57 and replaced with a full vessel 56' with sealing head 57.

The sealing head 57 can either be discarded or else recycled in a special process.

The septum 115 is made of an elastomer. Depending on the application, various elastomers can be used, such as natural rubber, synthetic rubber, ethylene-propylene rubber EPM, fluoro elastomers FKM and FEPM, perfluoro elastomer Kalrez®, ethylene-vinyl acetate EVA, butyl rubbers and others. Because of their chemical and physical properties, butyl rubbers are particularly preferred as material for the septum, since they are very resistant to acids and alkaline solutions and are elastic and have a Shore A hardness of 40 to 85 and an elongation at break of 700%. The good chemical stability is important since in the unlikely event that very small particles were nonetheless to get into the process liquid, this would not be adversely affected. The good elasticity and the good elongation at break enable reliable piercing of the septum 115 in the vessel holder 58, without the powder 59 emerging during this procedure, and likewise secure sealing of the septum 115 after the removal of the vessel 56 from the vessel holder 58 and the withdrawal of the cannula 134 associated therewith. It is important that after the removal of the vessel 56 from the vessel holder 58 the septum 115 independently seals again and thus prevents the emergence of powder 59 from the vessel 56.

Figure 3:
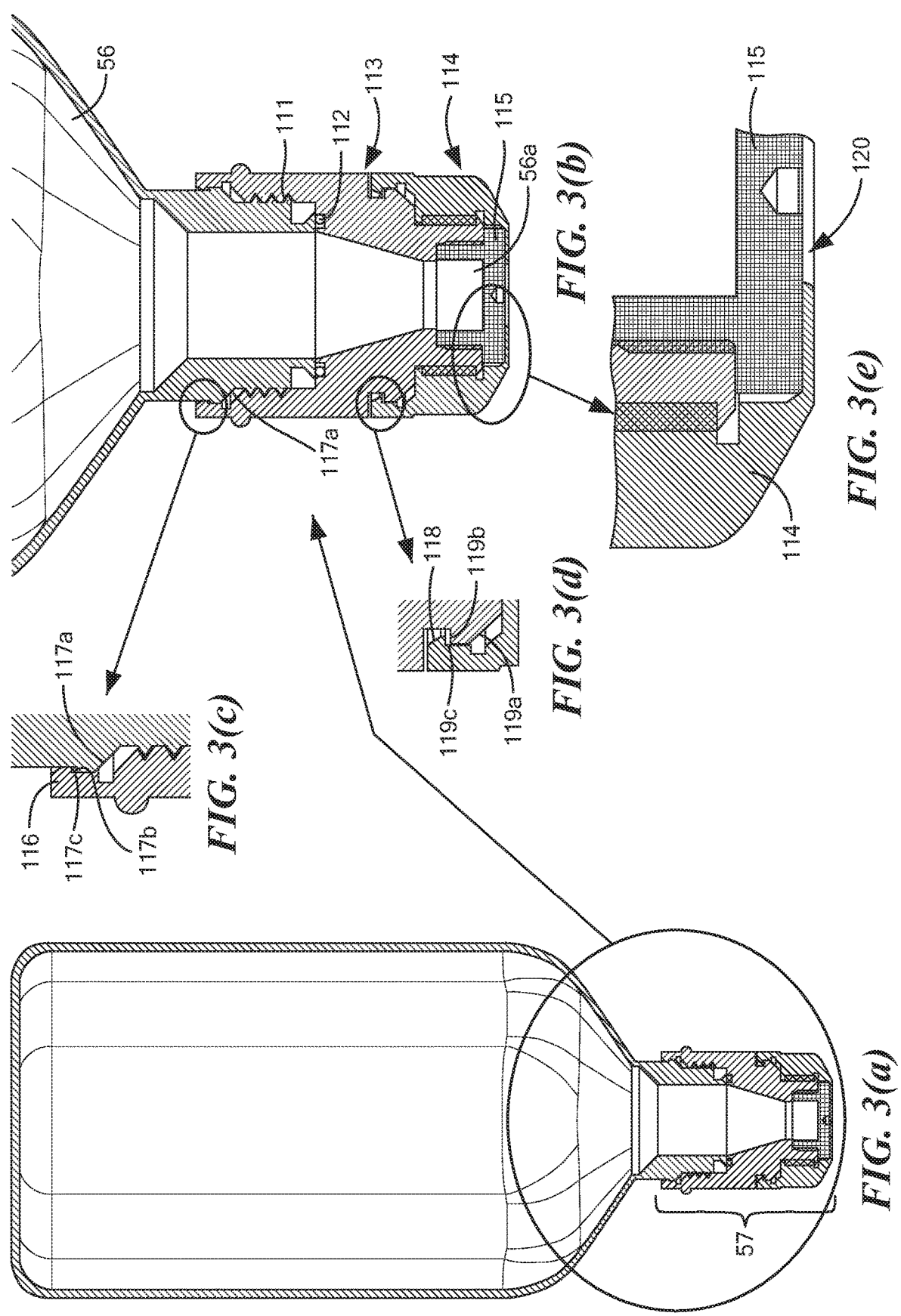
FIG. 3(a): a section view through the vessel with sealing head from FIG. 2, FIG. 3(b): an enlarged view of the circled portion of FIG. 3(a), FIG. 3(c): an enlarged view of a portion of FIG. 3(b) that shows in greater detail how locking or snap-on elements provided on the septum adapter lock/snap into complementary locking or snap-on elements provided on the vessel above the vessel thread.
FIG. 3(d): an enlarged view of a portion of FIG. 3(b) that shows in greater detail how the septum cap locks onto the septum adapter.
FIG. 3(e): an enlarged view of a portion of FIG. 3(b) that shows in greater detail the connection of the septum to the septum cap.
Figure 4:
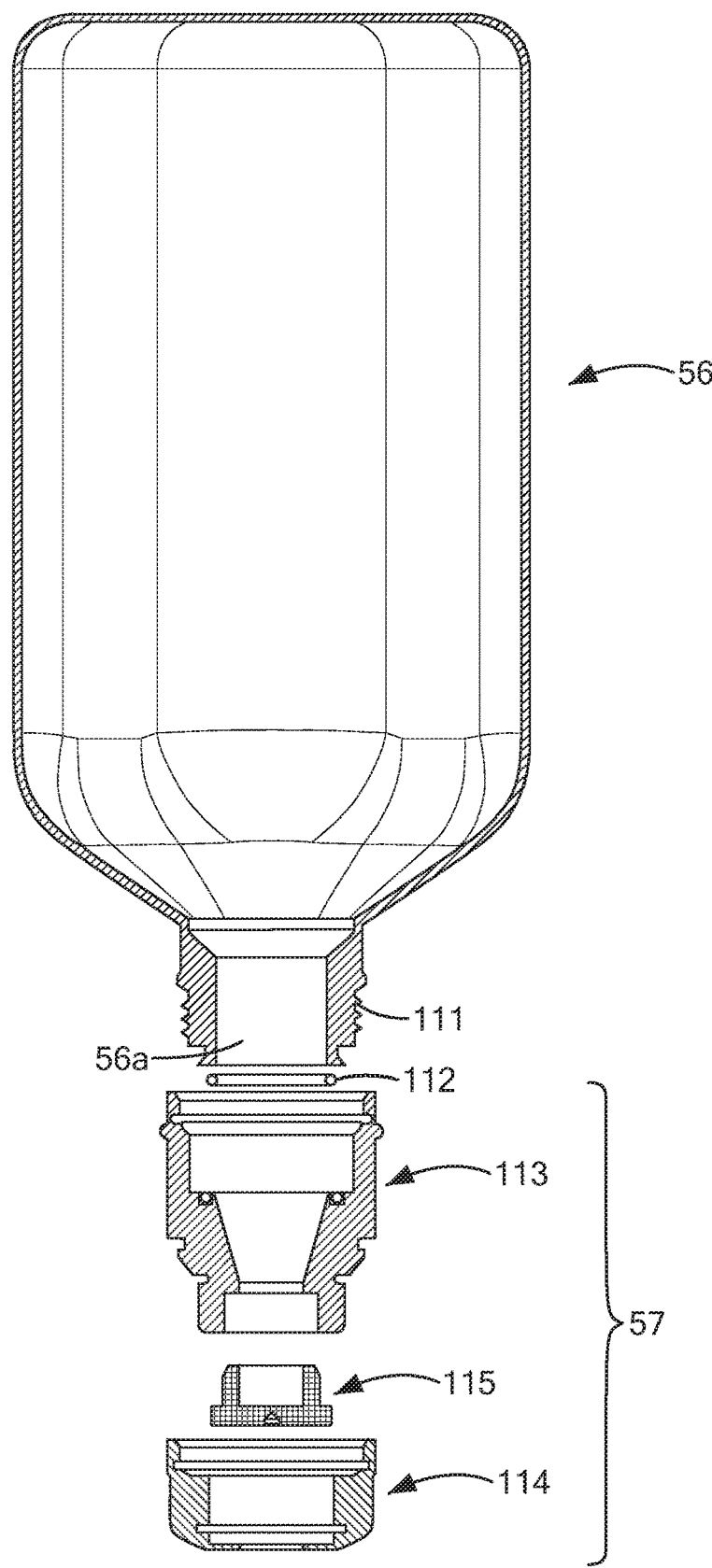
FIG. 4: an exploded view of the vessel with sealing head from FIG. 3(a), FIG. 5(a): a section view through the vessel with sealing head and the vessel holder from FIG. 1, FIG. 5(b): an enlarged view of a portion of FIG. 5(a) that shows the air flow in the gap.

The shape of the septum 115 can be a disc or, as in the section shown in FIGS. 3(a), 3(b), 3(e) and 4, shaped as a plug. The plug shape is preferred, since this shape yields a secure seal between the septum adapter 113 and the septum 115 during the piercing and withdrawal. The large sealing area of the plug shape ensures a secure seal even on the occurrence of large forces on the septum 115, as occurs during piercing or withdrawal. The pressing forces which are required by the septum cap 114 in the region of the septum 115 can be kept small through the plug shape of the septum 115 and nonetheless ensure a good seal. As a result, the wall thicknesses needed can be kept thin. Thus it is possible to form a transition from the septum cap 114 to the septum 115 beneficial to flow, as shown in FIGS. 3(e) and 5 in the transition region 120.

Internally in the region up to the vessel thread 111, the vessel 56 has the shape of a funnel. And the septum adapter 113 inside up to the septum 115 is also shaped as a funnel. This shaping makes it possible to empty the whole of the powder 59 from the vessel 56. Depending on the powder type and vessel 56, it can be necessary to vibrate, so that the powder 59 reliably falls downwards in the direction of the septum 115 and the vessel 56 can be completely emptied.

Figure 2:
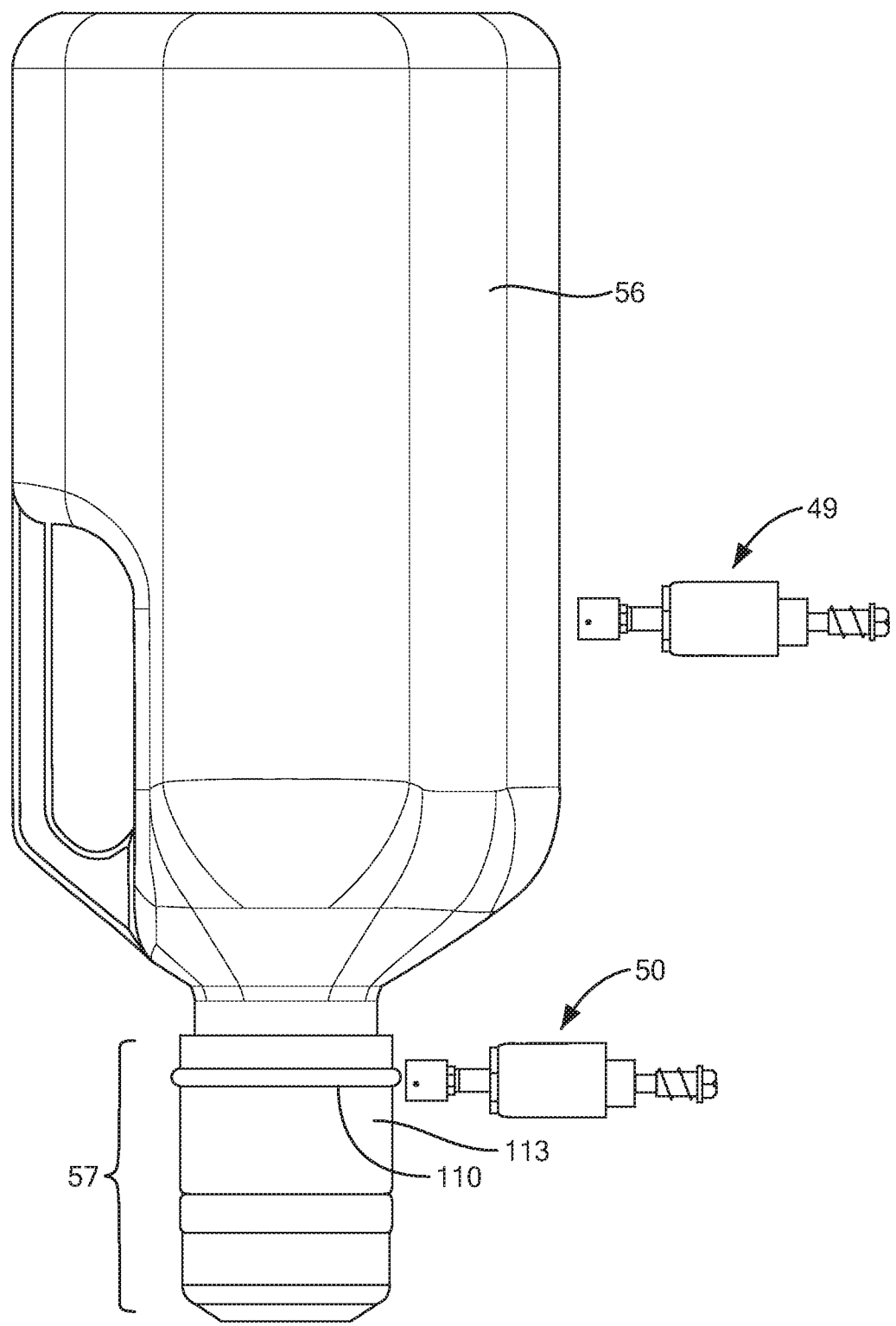
FIG. 2: a side view of the vessel of the powder metering device of FIG. 1 with sealing head and vibrator.

In order to achieve complete emptying of the powder 59 from the vessel 56, one or more vibrators 49 can be provided on the vessel 56 and/or one or more vibrators 50 on the septum adapter 113 (FIGS. 1 and 2). The site and number of the vibrators 49 and 50 is strongly dependent on the nature of the powder 59 and the shape of the vessel 56.

The vibrator 50 on the septum adapter 113 has been found very effective. This arrangement vibrates sufficiently to completely empty the vessel 56, without compacting the powder 59 so strongly that a blockage occurs. In order to configure the effect of the vibration reproducibly even after frequent changing of the vessel 56, the septum adapter 113 has on its outer wall a beading 110 (FIG. 2), which ensures that irrespective of the exact positioning of the vibrator 50 the vibrations are always introduced at the same place in the septum adapter 113. As vibrators, for example electromechanical, piezo-electric, pneumatic vibrators or eccentric vibrators can be used.

Figure 8:
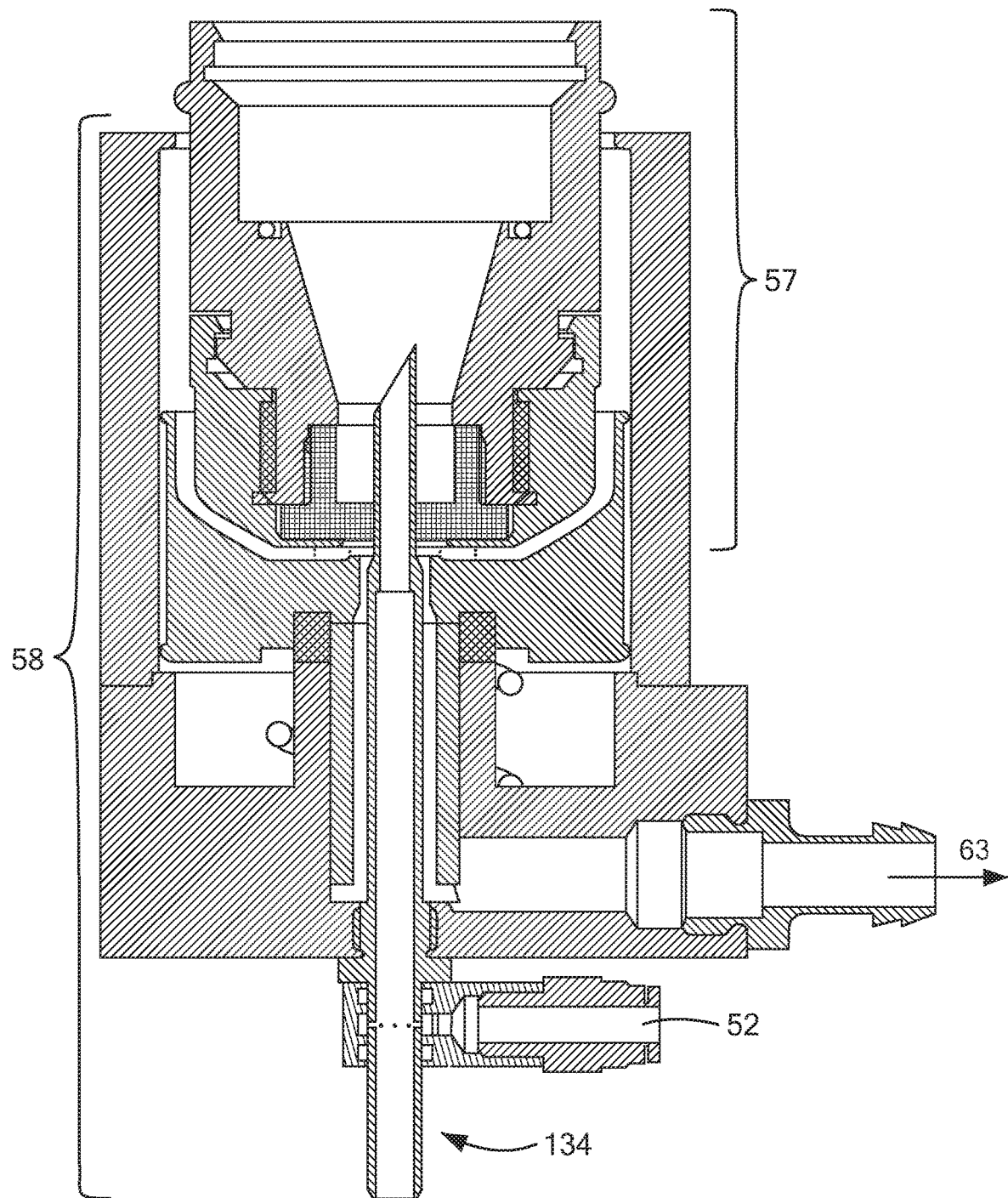
FIG. 8: a section of the vessel holder with the cannula and the sealing head corresponding to FIG. 5(a), but with pierced septum.
Figure 9:
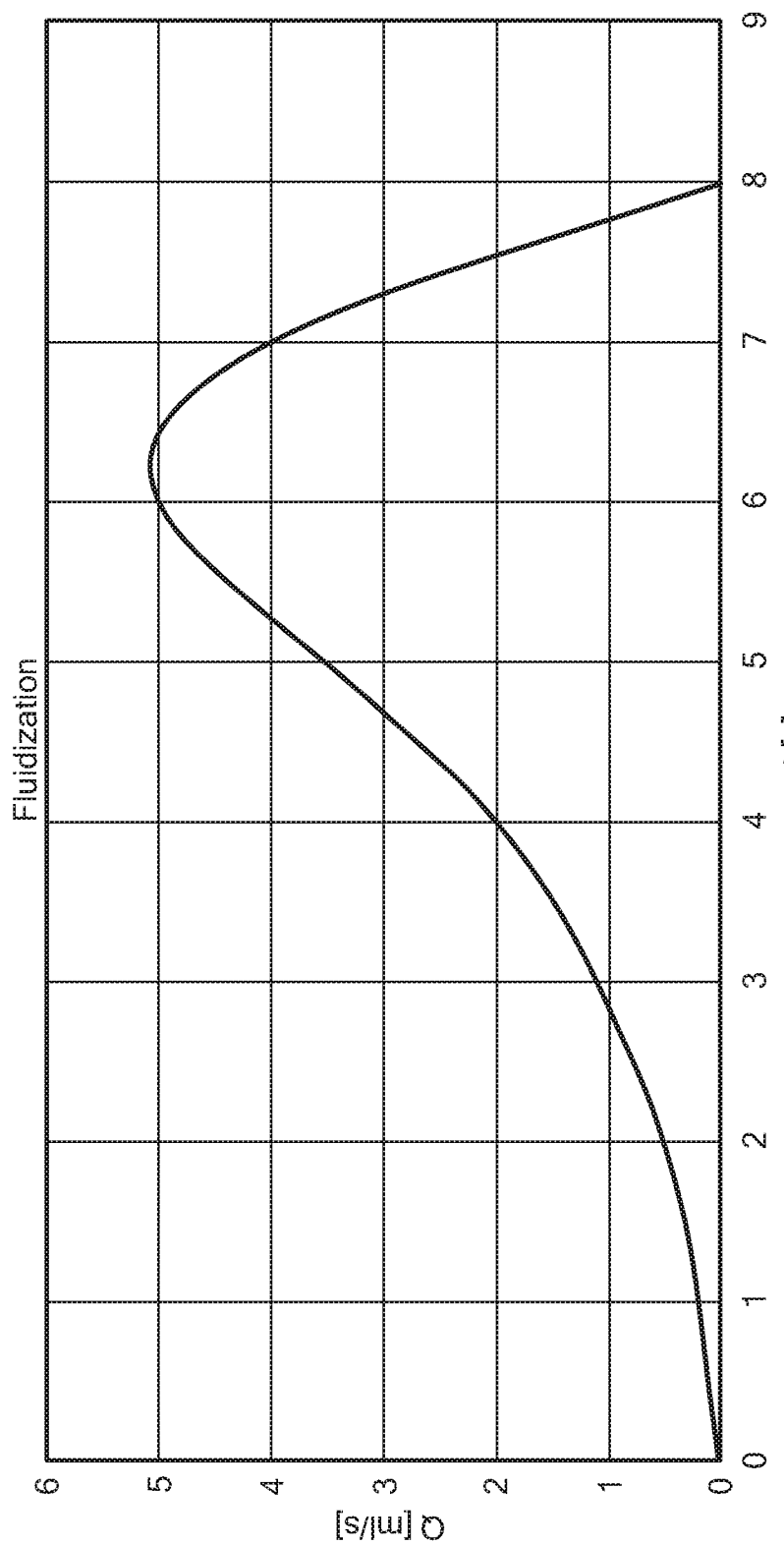
FIG. 9: an example of an airflow-time diagram of a fluidization.

The vessel 56 with sealing head 57 and septum adapter 113 is inserted into the vessel holder 58. In order to fill the metering hose 33 with the powder 59, the cannula 134 in the vessel holder 58 is pierced into the septum 115, and the powder 59 flows downwards in the cannula 134 (see FIGS. 5(a) and 5(b) and FIG. 8). Via a pipe 52, which extends at right angles to the longitudinal direction of the cannula 134, gas is pressured by means of the fluidization pump 25 into the downward-flowing powder in the cannula 134 in order to fluidize this. For this, the gas is passed through the holes 139 in the outer wall of the cannula 134 shown in FIG. 5(a). As a result, the flowability of the powder 59 is ensured and the volume of the powder flowing into the metering hose 33 replaced by gas. Thus no negative pressure arises in the vessel 56 and no gas has to flow against the flow direction of the powder 59. This ensures reproducible filling of the metering hose 33. By means of a pump, both the volume and also the rate at which the gas is pressured into the powder 59 can be very precisely set.

In order to achieve high reproducibility of the powder volume to be metered, it is necessary that the bulk density of the powder which reaches the metering system be as constant as possible.

On the one hand, the powder in the region of the cannula has a different bulk density depending on the fill level of the vessel.

On the other hand, non-reproducible bulk densities in the metering system can also derive from a negative pressure in the vessel, since gas is then sucked from the measurement system into the vessel against the flow direction of the powder. Thus it is necessary to replace the volume of the powder taken from the vessel with gas, in order to avoid non-reproducible bulk densities in the metering system.

According to the invention, before the transfer into the metering system, the powder is fluidized by the fluidization pump 25, with which gas is pressured into the downward-flowing powder, and in such a manner that the flow of the gas changes with time during the fluidization. In this way, the bulk density in the metering system can be kept essentially constant. The fluidization is performed before the opening of the pinch valve 28.

It is also important that the fluidization occurs only in a limited region of the cannula, so that the gas is accumulated very locally, before the powder is transferred into the metering system.

Figure 11B:
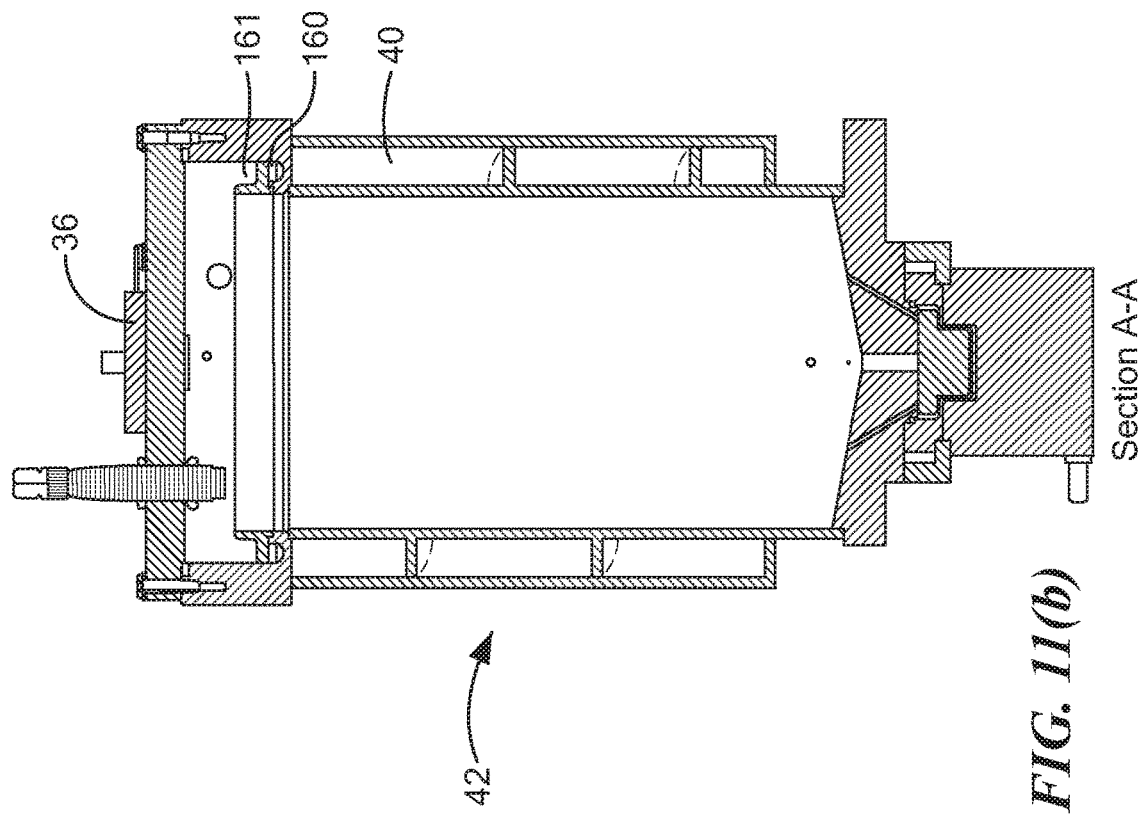
Figure 11A:
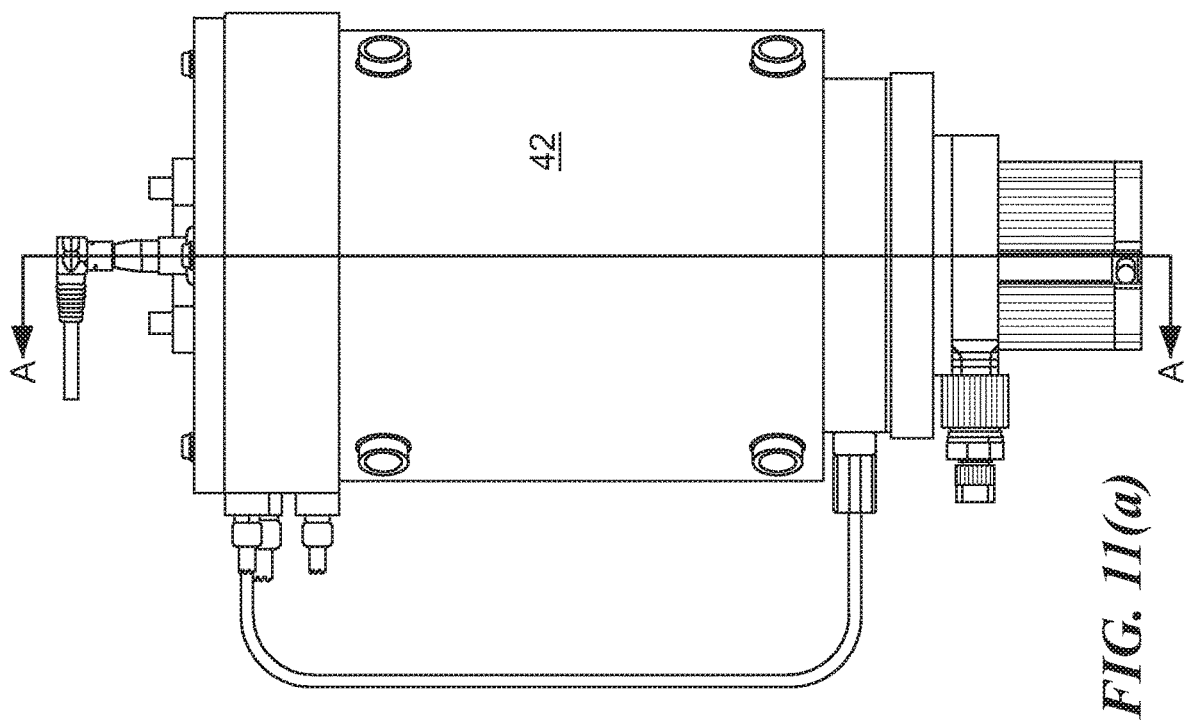

In a first variant, the pump 25 is controlled such that before metering the same airflow-time profile is always used for the fluidization, as shown in FIGS. 11(a) and 11(b).

A further improvement of the reproducibility of the bulk densities can be achieved in a further variant by adapting the airflow-time profile to the particular fill level of the vessel.

The total gas volume for the fluidization corresponds to about 0.3 to 3.0 times and preferably 0.5 to 2.0 times the volume of the metering system ($l*di^2*\pi/4$).

The variation of the gas flow with time essentially corresponds to the degree of spreading of the gas cushion in the powder in the region of the cannula. It is important that the gas is not accumulated only in the cannula, but also emerges from the cannula into the vessel. It is even important that the major part of the gas reaches the lower part of the vessel. Hence the greatest gas volume is pressured into the powder at the end of the fluidization.

FIGS. 11(a) and 11(b) show the variation of the gas flow with time during a fluidization by means of a pump. Preferably, the flow of the gas firstly increases slowly and reaches maximum flow rate before the end of the fluidization. Depending on the properties of the powder, it is necessary to set a fluidization typical for a powder.

Alternatively, a time-controlled valve can also be used instead of a pump. Depending on the properties of the powder 59 to be metered, various gases can be used, where dry and oil-free air, nitrogen and argon can be mentioned as the most usual. Nitrogen and argon are readily used if the powder for example can oxidize or is hygroscopic.

Via the suction pipe 63, which extends above the fluidization pipe 52, the vessel holder 58 is aspirated permanently or from time to time, depending on the use. The dust filter 26 (FIG. 1) prevents particles from getting into the exhaust air pump 27. This arrangement, which is shown diagrammatically in FIG. 1, can also be replaced by a central exhaust air system. Then the suction pipe 63 is connected directly to the central exhaust air system. Likewise, the outlet of the dust filter 26 can be connected to an exhaust air system, whereby entry of particles into the exhaust system is prevented, since these are retained by the dust filter 26.

FIG. 5(a) shows the longitudinal section through the vessel holder 58 with applied, non-inserted sealing head 57. The sealing head 57 is inserted into the holding bowl 131 of the vessel holder 58. The holding bowl 131 is shaped such that the sealing head 57 is introduced centred into the holding bowl 131. This is achieved by means of the three notches 137 on the holding bowl 131, see FIG. 6(a). More than three notches 137 can also be provided. Also, spacers 138 are provided which, together with the notches 137, provide a defined air gap 200 between sealing head 57 and holding bowl 131. More spacers 138 can also be present. These can also be adjustable, so that the air gap 200 in the region of the septum 115 can be adjusted to the required flow rate. Flow rates of 2-35 m/s are required depending on the properties of the powder 59, and the materials used for the production of holding bowl 131, septum cap 114 and the septum 115 and the surface condition thereof.

In FIG. 5(b), the airflow in the gap 200 is shown as a dashed line. The airflow is created by the aspiration of the ambient air via the suction pipe 63. The air is sucked in between holding bowl 131 and sealing head 57 and passed via the central hole in the holding bowl 131 along the cannula 134 to the connector of the suction pipe 63 in the holding lower part 133.

Through the continuously decreasing cross-section between holding bowl 131 and sealing head 57, the flow rate increases continuously and is greatest in the region of the septum 115. The septum cap 114, which engages the septum 115 in its edge region partially from below, has in the direction of the centre of the septum 115 a rounded edge 135, as shown in FIG. 5(b), which is designed to favour the flow. The central region of the septum 115 does not lie on the septum cap 114, but is accessible. The holding bowl 131 on its upward-facing side lying opposite the central region 120 of the septum 115 has a rounding 136 corresponding to the underside of the rounded edge 135 of the septum cap 114, so that the airflow is directed upwards in the direction of the septum 115, as shown in FIG. 7(b). As a result, the best possible flow onto the septum 115 is ensured. This flow onto the septum 115 ensures that particles falling out during the piercing of the septum 115 with the cannula 134 or during the withdrawal of the cannula 134 can be specifically aspirated. It is thus ensured that no particles remain hanging on the septum 115 or on the sealing head 57. Thus the vessel 56 can be removed from the vessel holder 58 without there being a risk that particles can escape into the surroundings. Depending on the material from which the individual parts are made and the properties of the powder 59, it can be necessary to ionize the air drawn in. This prevents the possibility of the particles not being removable by suction because of static charge.

A pressure spring 132 presses the holding bowl 131 upwards to a catch 131a in the guide pipe 130 of the vessel holder 58. The spring 132 is pre-tensioned such that the septum 115 cannot be pierced by the cannula 134 because of the weight of the vessel 56 itself. This prevents uncontrolled piercing of the septum 115 by the cannula 134 from occurring. Controlled piercing of the septum 115 with as uniform as possible a movement is necessary in order to prevent the emergence of powder 59 during the piercing of the septum 115. In the simplest case, a knee lever 141 can be used, as shown in FIG. 7(a) and FIG. 7(b), in order to press the vessel 56 downwards, in order to pierce the septum 115 with the cannula 134, see FIGS. 5(a) and 5(b) and FIG. 8. If the knee lever 141 is released again, the vessel 56 is pressed against the knee lever 141 by the spring 132, so that a controlled withdrawal of the vessel 56 with the sealing head 57 with the septum 115 from the cannula 134 is ensured. Instead of a manual knee lever 141, automatic drives with or without knee lever 141, such as pneumatic, hydraulic or electrical systems, can also be used.

The cannula 134 pierces the septum 115 so far that the ground point of the cannula 134 comes to rest inside the vessel 56, so that the powder can flow into the cannula.

In order to prevent the emergence of powder 59 during the piercing and withdrawal of the cannula 134 from the septum 115, the shape of the point and the cut of the cannula 134 is decisive. It has been found that the ratio of the thickness of the septum 115 to cannula external diameter in the range from 0.4 to 1.0 is ideal. Various cuts on the cannula 134 can be used. The best known are lancet cut, facet cut and others which are known from medicine. It is important that during the piercing no hole is punched in the septum 115, but the whole septum 115 is only pierced and parts of the septum 115 do not get into the cannula 134 or into the powder 59.

Figure 10:
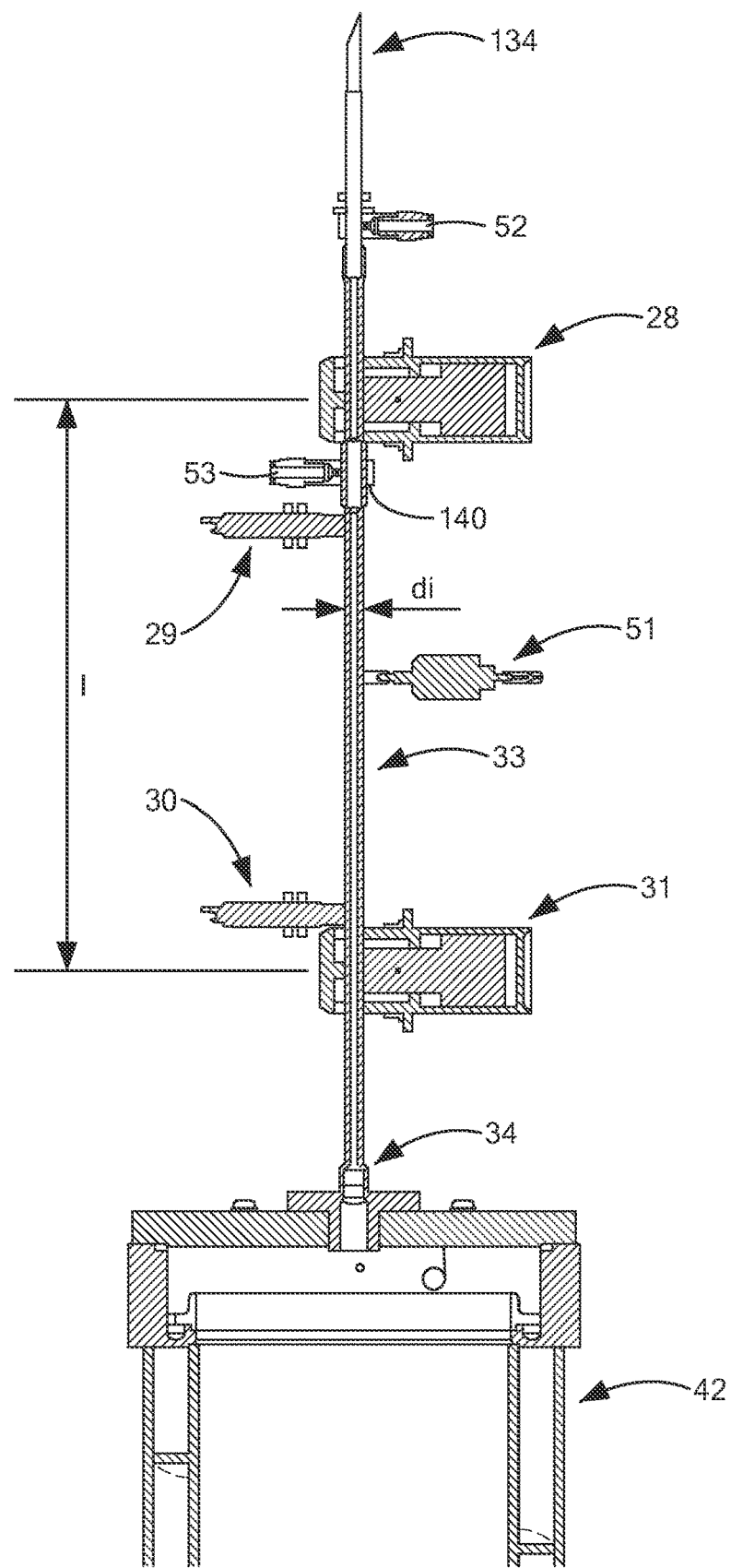
FIG. 10: a section view through the metering system shown in FIG. 1, FIG. 11(a): a side view of the mixing vessel of FIG. 1, FIG. 11(b): a section view of the mixing vessel of FIG. 11(a) taken along line A-A.

With the powder metering device according to the invention, a defined volume of powder 59 can now as required be metered as follows. If the septum 115 is pierced with the cannula 134, then the powder 59 flows through the cannula 134 into the metering hose 33. The metering system is shown in section in FIG. 10 and diagrammatically in FIGS. 11(a) and 11(b). If the pinch valve 28 is closed, then the metering hose 33 fills up to the pinch valve 28. If the pinch valve 28 is open and the pinch valve 31 shut, then the metering hose 33 fills from the vessel 56 up to the pinch valve 31. If the pinch valve 28 is closed and the pinch valve 31 opened, the powder flows between the pinch valves 28 and 31 through the connector head 34 into the mixing vessel 42. The volume of the metered powder 59 is calculated from the distance I and the internal diameter di of the metering hose 33, as shown in FIG. 10. By variation of the distance between the two pinch valves 28 and 31, the volume of the powder 59 to be metered can be adjusted. During the emptying of the metering hose 33, gas can be pumped via the hose 53 into the outlet nozzle 140 by means of the pump 32. This serves to push the powder 59 out of the metering hose 33 in a controlled manner. The outlet nozzle 140 is attached directly after the pinch valve 28. Dry air, nitrogen, argon or other suitable gases can be used. Instead of the outlet nozzle 140, a vibrator 51 can also be attached on the metering hose 33 in order to guarantee the complete outflow of the powder 59. Outlet nozzle 140 and vibrator 51 can also be used together. Instead of the pump 32, a time-controlled valve with or without choke can also be used.

The metering hose 33 should be of an elastic material with good recovery behaviour. Suitable hose materials are silicone, neoprene, marprene, fluoro elastomer, PFL-reinforced fluoro elastomers and others. The metering hose 33 can also be made in rigid pipes and only made with an elastic hose in the region of the pinch valves 28 and 31. Since the tolerances of the internal diameter of elastic hoses are as a rule greater than those of pipes, the metering volume from position to position is more reproducible with pipes. With the described structure of a metering hose 33 (with or without pipe) a repetition accuracy of the metered-in volume of <1% can be achieved.

The connector head 34 is maintained at a higher temperature than the ambient temperature. This prevents blockages being able to occur due to moisture at the outlet of the connector head 34. The connector head 34 can be maintained at a defined temperature by means of a heating cartridge and a temperature sensor, shown as heating 35 in FIG. 1. The temperature control of the connector head 34 can be effected by means of other media, for example with hot fluids or gases.

With the temperature sensor 39, the process management system 12 can set the temperature of the connector head 34 such that condensation cannot occur on the connector head 34. By means of the pump 62, the gas space above the process liquid 24 can be specifically flushed with gas via the connection 61. Usual gases are dry air, nitrogen and argon through the introduction of gas, the humidity in the space can be reduced and the blocking of the outlet at the connector head 34 thereby prevented. Also by the use of suitable gases, the oxidation of the powder 59 and the process liquid 24 can be reduced or prevented. Instead of the pump 62, a time-controlled valve with or without choke can also be used.

With the powder sensor 29, it can be established whether the metering hose 33 between the pinch valves 28 and 31 is completely filled. With the powder sensor 30, it can also be established whether the metering hose 33 has emptied itself after the opening of the pinch valve 31. Measurement principles suitable for the powder sensors 29 and 30 are for example capacitive, ultrasonic or infrared measurement.

When the powder 59 leaves the connector head 34, then it falls into the mixing vessel or dissolving vessel 42, where the powder 59 mixes with the process liquid 24 or dissolves. The fill level of the process liquid 24 in the mixing vessel 42 is regulated such that this is kept between the fill level sensors 37 and 38. For this, the valves 19, 18, 21 and pump 43 are available to the process management system 12. The process management system 12 regulates the fill level such that it permanently fluctuates up and down between the fill level sensors 37 and 38. In this way, deposits due to powder 59 on the walls of the mixing vessel 42 are prevented. Instead of or in addition to the fill level sensors 37 and 38, a continuous fill level measurement can be used in order to guarantee better fill level regulation. In order to guarantee good mixing and/or dissolution of the powder 59 with the process liquid 24, a stirrer 36 is built into the mixing vessel 42. This is controlled by the process management system 12. Mechanical stirrers, magnetic stirrers or hydraulic mixers for example the tank mixer PTM-200 from Levitronix, can be used. In FIG. 11, a cross-section through the mixing vessel 42 with a hydraulic mixer is shown.

Process liquids 24 often have an elevated temperature of up to 90° C. In order to ensure that the process liquid 24 does not cool down in the mixing vessel 42, the mixing vessel 42 can be made double-walled 40. If an exothermic reaction takes place during the dissolution of the powder 59, it is necessary to remove the energy produced. This can be effected by means of a temperature control system 41. The cooling or heating fluid is pumped by the temperature control system 41 via the pipe 54 into the intermediate space and again back into the temperature control system 41 via the pipe 55. The materials for the mixing vessel 42 must be chosen according to the use. Fluorinated plastics are used in particular since these are temperature-resistant and have very good chemicals resistance.

Figure 12:
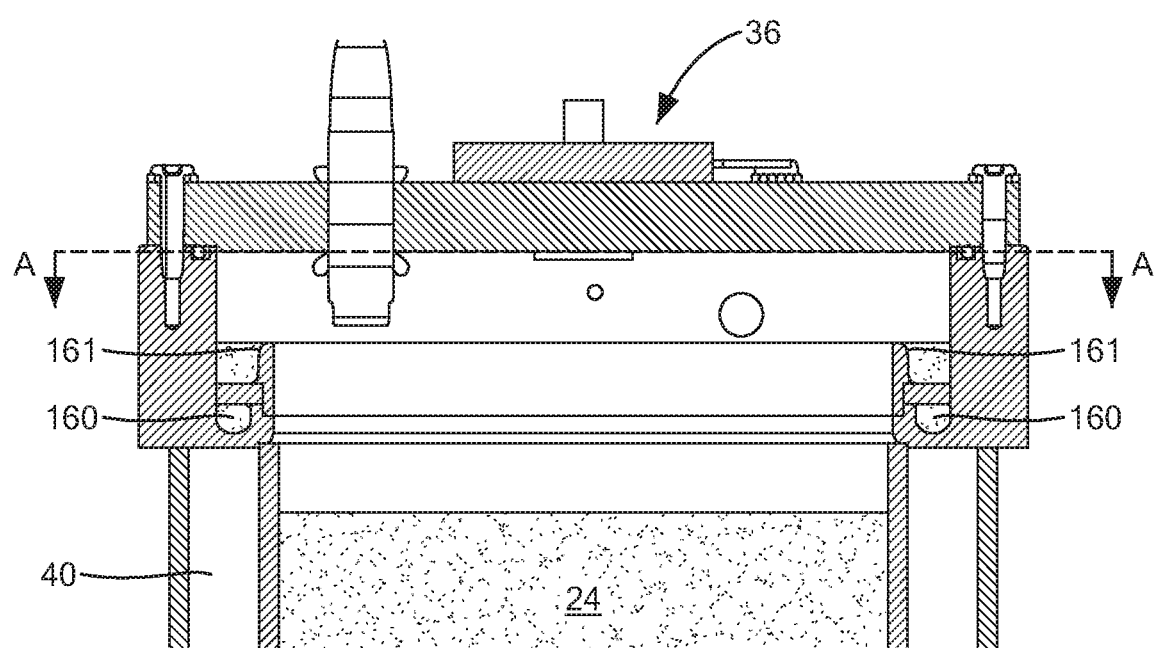
FIG. 12: an enlarged section view of the upper region of the mixing vessel from FIG. 11(b), FIG. 13: a top view of a connector of the mixing vessel.
Figure 13:
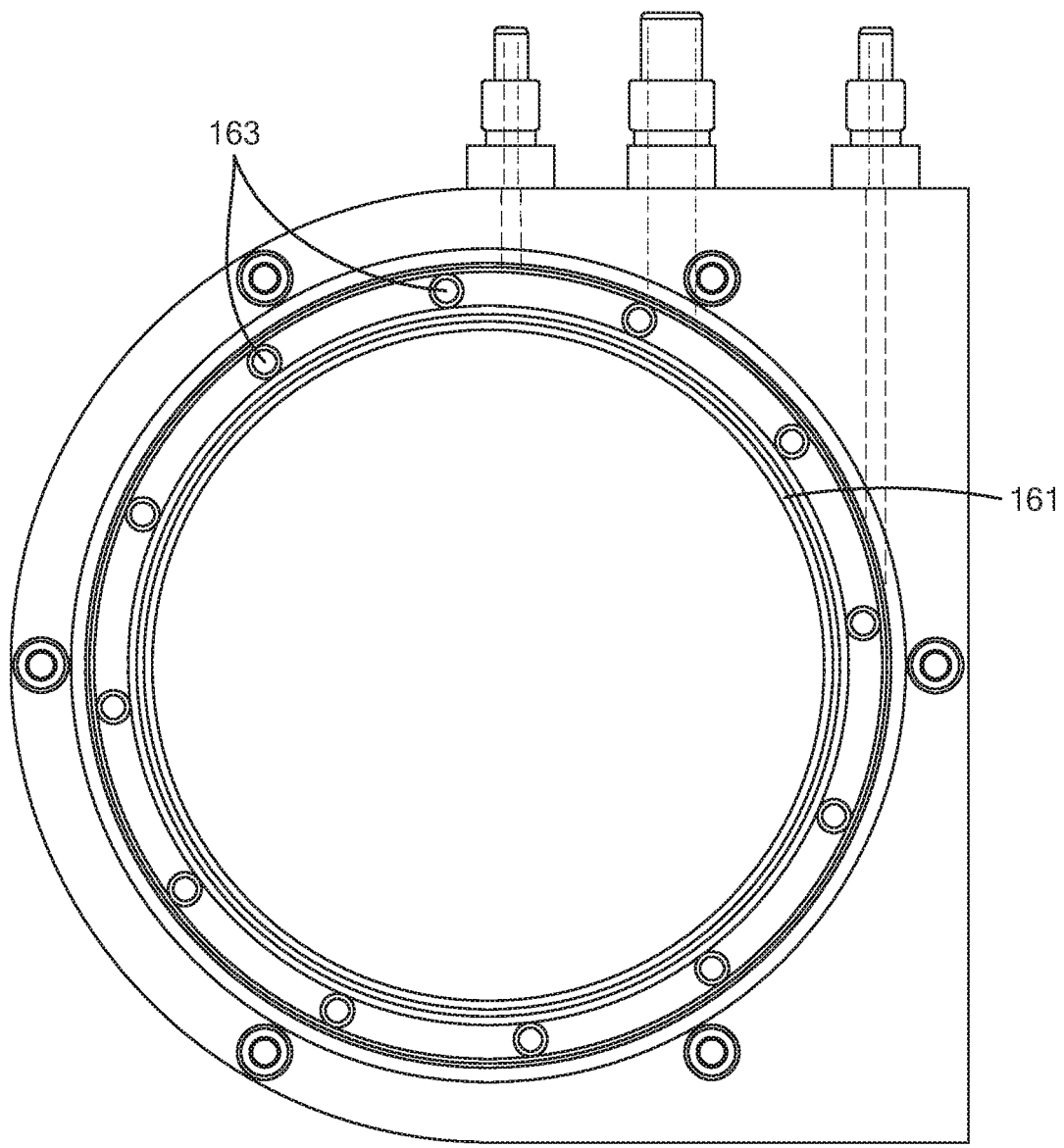

On the emergence of the powder 59 from the connector head 34, the powder can deposit on the walls of the mixing vessel 42. In order reliably to prevent the powder depositing on the walls of the mixing vessel 42 above the maximum level of the process liquid 24, the inlet into the mixing vessel 42 is equipped with an overflow weir 161. The process liquid 24 is passed into the inlet channel 160 via the pipe 20 (shown in FIG. 12). The pipe 20 (FIG. 1) is connected to the connector 162, which passes the process liquid 24 tangentially into the inlet channel 160, shown in FIG. 13. Through this tangential introduction, an almost uniform pressure distribution in the inlet channel 160 is achieved. Thus the process liquid 24 flows uniformly through the holes 163 to the overflow weir 161. From the overflow weir 161, the process liquid 24 flows downwards along the wall on the mixing vessel 42 and permanently washes any powder residues into the process liquid 24 and thus prevents accumulation of powder 59 on the side walls.

As required, the process management system 12 can permanently pass the process liquid 24 through the mixing vessel 42, and during this the valve 18 is closed and the valves 19 and 21 open. Or else, before the powder metering, valves 19 and 21 are closed and valve 18 opened, then the desired volume of powder 59 is fed into the mixing vessel 42 and during a defined time the powder 59 blends or dissolves. After this, valve 18 is closed and the valves 19 and 21 opened and the pump 43 sucks process liquid from the mixing vessel 42 via pipe 60 and maintains the circulation. If a hydraulic mixer is used, pump 43 and mixer can be integrated together.

Depending on the process, it can be necessary to purify the process liquid 24 from undesired particles after the dissolution of the powder 59. This can take place by means of one or more filters 45 and 47. It can also be necessary that one of the filters 45 and 47 is made as an activated charcoal filter in order to filter out undesired compounds. The pressure sensors 44, 46 and 48 are for monitoring the filters 45 and 47 and can detect clogging. Centrifuges can also be used.

Figure 14:
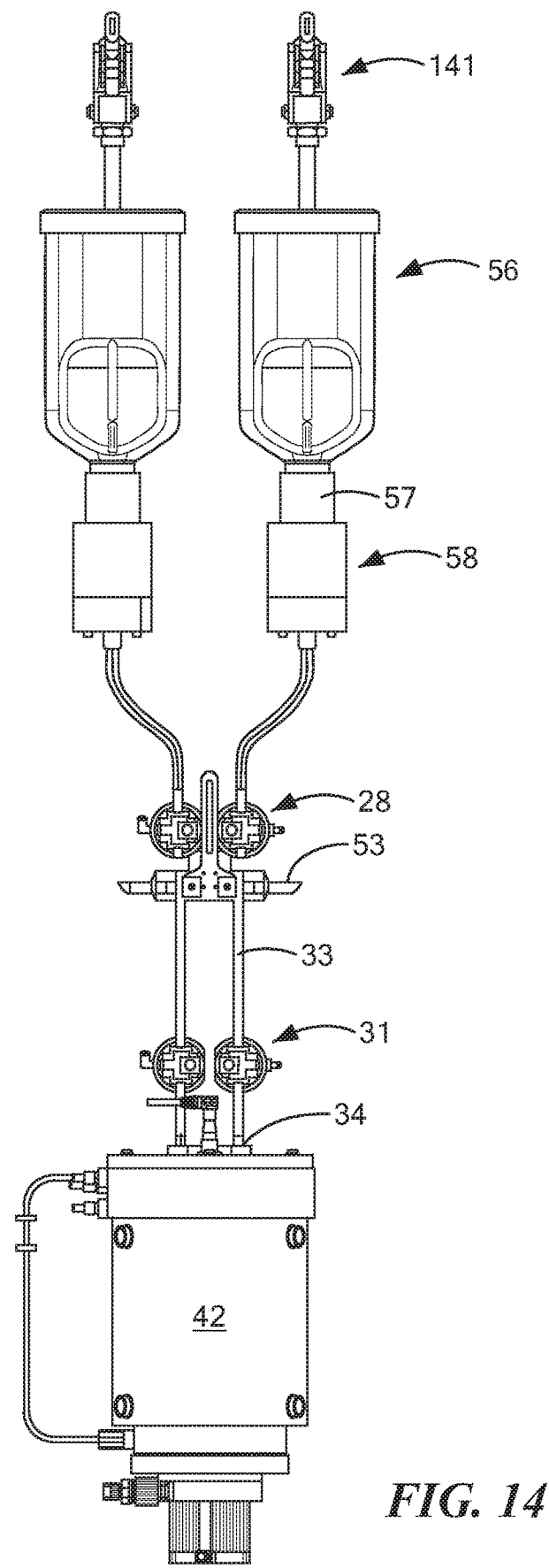
FIG. 14: a side view of a mixing vessel with two powder metering devices.

For one mixing vessel 42, two powder metering devices 23 can be provided, which use a common connector head 34, as shown in FIG. 14. In this way, the metering process does not have to be interrupted when one vessel 56 becomes empty. The process management system 12 then switches automatically from the empty to the full vessel 56. Now the operating personnel have time to replace the empty vessel 56 by a full one, without interrupting the metering process.

Figure 15:
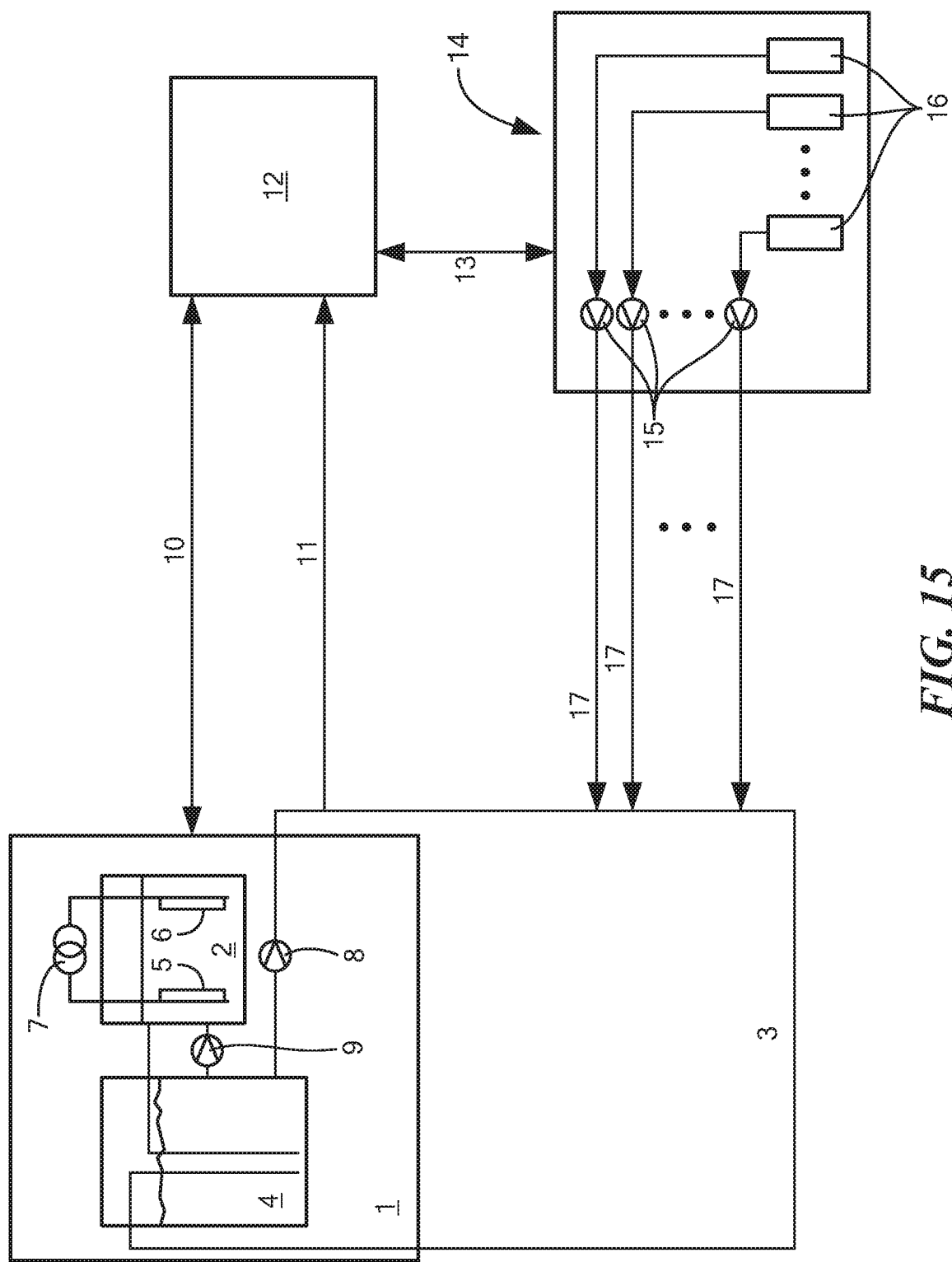
FIG. 15: a schematic design of a plant for an electroplating process with liquid metered addition according to the prior art
Figure 16:
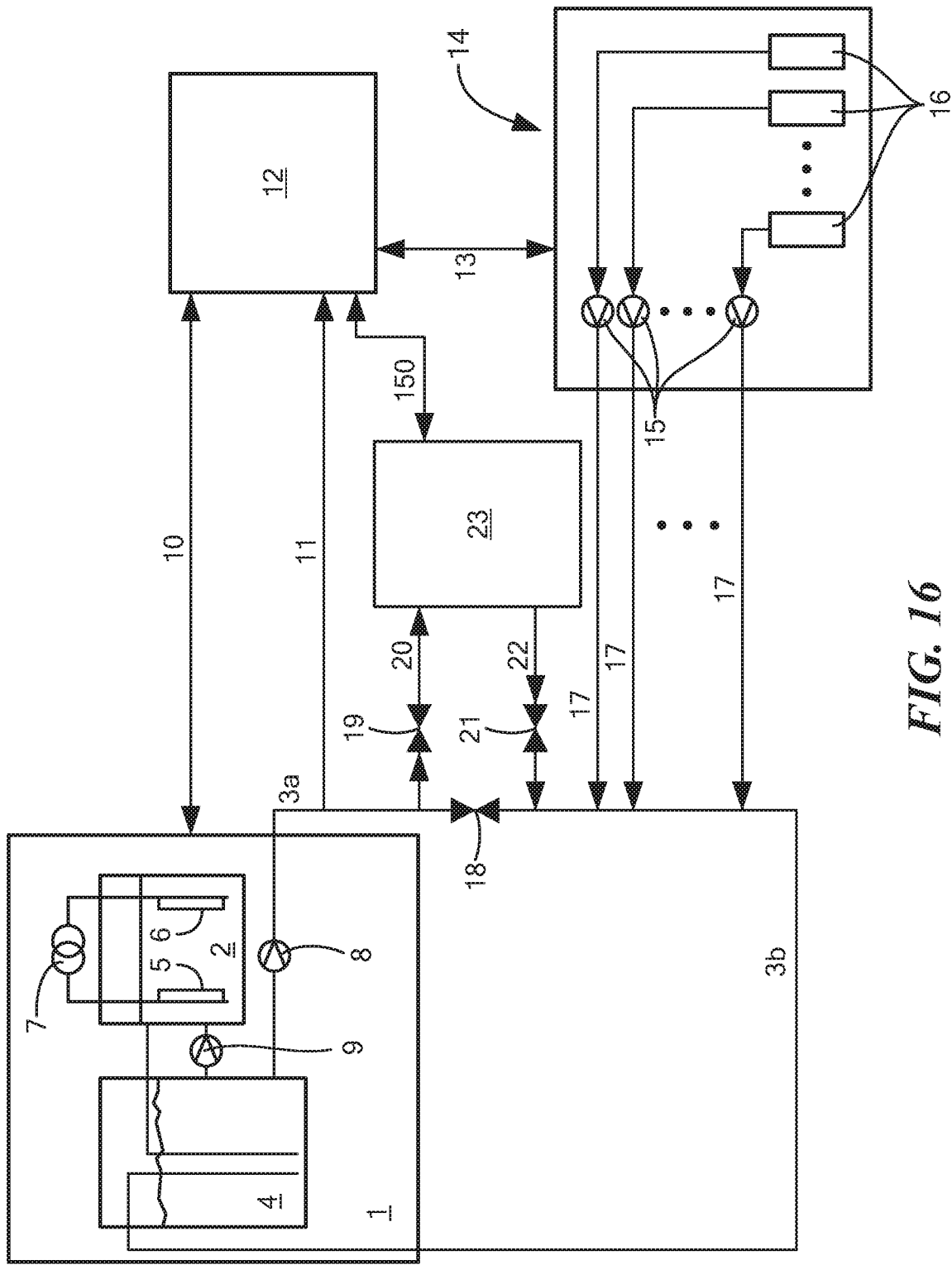
FIG. 16: a schematic design of a plant for an electroplating process with a powder metering device according to the invention.

In FIG. 15, the prior art is shown diagrammatically with the example of an electroplating process with liquid metered addition, and in FIG. 16 an example of the plant known from the prior art, in which the powder metering device 23 is built in.

The workpieces are coated with a metal layer in the production machine 1, FIGS. 15 and 16. The cathode 5 is electrically connected to the workpiece in the plating chamber 2. The anode 6 can be of a more inert material such as for example titanium, platinum or stainless steel or of the material to be deposited, such as for example copper or nickel. The quantity of material deposited on the workpiece is determined by the power source 7 from the quantity of charge Q, which is calculated via the current I and the time t. The plating chamber 2 is fed by the process pump 9 from tank 4 in order to guarantee a constant double layer on the cathode 5. From the tank 4, the process fluid 24 in the tank 4 is circulated with the circulation pump 8.

After the process pump 9 and the circulation pump 8, particle filters can be incorporated (not shown). From the circulation pipe 3, a small volume of the process liquid 24 is passed to the process management system 12 after the circulation pump 8 via the sampling pipe 11. The process management system 12 determines the concentration of the individual components of which the process liquid 24 is composed. The production machine 1 and the process management system 12 exchange data via the communication line 10. These data are needed inter alia to calculate the metering quantities of individual additional metering concentrations 16 by the process management system 12. The additional metering unit 14 is controlled by the process management system 12 via the communication line 13. On the basis of the analysis data and the data from the production machine 1, the process management system 12 continuously calculates the required metering volumes of the individual additional metering concentrations 16 and monitors the metering process. The individual pumps 15 pump the concentrates via the additional metering pipes 17 into the circulation pipe 3. The connectors of the additional metering pipes 17 must be attached on the circulation pipe 3 after the offtake of the sampling pipe 11, so as to prevent over-concentrated process liquid 24 reaching the process management system 12, false analytical results being generated and false additional metering volumes being calculated.

In FIG. 16, the plant from FIG. 15 is shown, to which the powder metering device 23 according to the invention is connected together with the relevant lines and valves. The powder metering device 23 is controlled and monitored by the process management system 12. Via the data line 150, the data necessary for this are exchanged between the systems, similarly to in the additional metering unit 14 described in FIG. 15. The circulation pipe 3 is divided into circulation pipe 3a and circulation pipe 3b by the bypass valve 18. Via the feed valve 19 and the feed pipe 20, the process liquid 24 in which the powder 59 is dissolved is passed to the powder metering device 23. Via the return pipe 22 and the return valve 21, the process liquid 24 with the dissolved powder 59 is fed into the circulation pipe 3b. If no powder metering takes place, the bypass valve 18 is closed and the circulation is permanently passed through the powder metering device 23. It is thereby ensured that there are no stagnating process liquids 24 in the whole system. In case of longer dissolution times of the powder 59, it can be necessary during the dissolution time to open the bypass valve 18 and to close the feed valve 19 and the return valve 21. It is thus ensured that the other functions as described in FIG. 15 continue to function without restriction. After completion of the dissolution time, the bypass valve 18 is closed and the feed valve 19 and the return valve 21 opened. With appropriate design of the powder metering device 23, the return valve 21 can also be replaced by a non-return valve.

The invention claimed is:

1. Device for metering powder, which comprises a vessel containing powder and a sealing head with a septum for the vessel, and the vessel points downwards with its opening, so that the powder can flow out of the vessel, and the device further has a vessel holder, which serves to hold the sealing head of the vessel, wherein the vessel holder has a cannula for piercing the septum and a gas for fluidizing the downward-flowing powder is fed to the cannula, and further a metering system is provided, which is based on the filling of a volume in a connecting hose separable by valves, wherein the bulk density of the powder in the connecting hose is kept essentially constant by a gas flow varying with time during the fluidization.

2. Device according to claim 1, wherein the gas volume of the fluidization amounts to between 0.3 and 3.0 times the separable volume in the connecting hose and/or the gas flow is greatest at the end of the fluidization.

3. Device according to claim 1, wherein the sealing head is connectable powder-tight with the vessel and the septum with the sealing head, and wherein a gap is present between the sealing head and a holding bowl of the vessel holder, in which a gas flow between the holding bowl and the sealing head can be created.

4. Device according to claim 3, wherein the cross-section of the gap between the holding bowl and the sealing head decreases in the direction of the septum, so that the flow rate of the gas increases in the direction of the septum.

5. Device according to claim 3, wherein the gap between the holding bowl and the sealing head is shaped such that the flow rate is maximal on the septum and/or the flow is guided against the septum in order to remove powder particles from the septum and the sealing head.

6. Device according to claim 3, wherein the holding bowl of the vessel holder is pressed upwards against a catch on a guide pipe of the vessel holder by a spring element and/or the holding bowl is formed such that the sealing head can be introduced centred into the holding bowl and/or notches and/or spacers are provided on the vessel holder and/or the sealing head to form the gap.

7. Device according to claim 1, wherein the sealing head has a septum adapter and a septum cap with an opening, wherein the septum cap serves to press the septum against the septum adapter.

8. Device according to claim 7, wherein complementary locking or snap-on elements on the sealing head and the vessel and/or complementary locking or snap-on elements on the septum adapter and the septum cap are formed, which enter into a non-detachable or difficult to detach connection with one another after respectively the sealing head is screwed or pushed onto the vessel and the septum cap onto the septum adapter.

9. Device according to claim 7, wherein the vessel inside in the region towards a vessel thread and/or the septum adapter inside is shaped as a funnel and/or the device contains at least one vibrator on the vessel and/or on the septum adapter.

10. Device according to claim 1, wherein the gas is fed into the cannula via a side pipe and via openings in the cannula wall.

11. Device according to claim 1, wherein air flow is created by suction of ambient air via a suction pipe, the air is sucked in between the sealing head and the holding bowl and is passed via a central hole in the holding bowl along the cannula to the connector of the suction pipe.

12. Device according to claim 1, wherein an attachment head which is heatable is attached to the metering system.

13. Device according to claim 12, wherein the attachment head is connected to a mixing vessel which has an inlet channel wherein process liquid is introduced into the inlet channel.

14. Device according to claim 12, wherein the attachment head is connected to a mixing vessel which has an inlet channel wherein process liquid is introduced tangentially into the inlet channel and the inlet channel has an overflow weir in order to prevent powder deposits on walls of the mixing vessel.

15. A method for powder metering, the method comprising providing the device according to claim 1, and using the device to meter a powder in a clean-room or to meter a powder harmful to health.

16. The method according to claim 15, wherein the powder is made of a material selected from the group consisting of boric acid, tin(II) oxide and copper(II) oxide.

17. A method for producing chemical products under clean-room conditions, the method comprising metering powder with the device according to claim 1 and producing chemical products with the metered powder.

18. The method according to claim 17, wherein the chemical products are wafers, circuit boards, substrates or multi-chip modules.

19. The method according to claim 17, wherein the production under clean-room conditions is effected by coating, electroplating, pickling, degreasing, etching, precipitations or chemical reactions.

20. Device according to claim 1, wherein the gas volume of the fluidization amounts to between 0.5 and 2.0 times the separable volume in the connecting hose and/or the gas flow is greatest at the end of the fluidization.

\* \* \* \* \*